(12) United States Patent
Novelen et al.

(10) Patent No.: US 11,542,780 B2
(45) Date of Patent: Jan. 3, 2023

(54) MULTIPLE SYSTEM PORTS USING A TIME DELAY VALVE

(71) Applicant: Halliburton Energy Services, Inc., Houston, TX (US)

(72) Inventors: Ryan Michael Novelen, Grand Prairie, TX (US); Edmund Christopher Williamson, Little Elm, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 182 days.

(21) Appl. No.: 16/870,331

(22) Filed: May 8, 2020

(65) Prior Publication Data

US 2021/0348478 A1     Nov. 11, 2021

(51) Int. Cl.
| | | |
|---|---|---|
| *E21B 34/14* | (2006.01) | |
| *F16K 3/26* | (2006.01) | |
| *E21B 34/06* | (2006.01) | |
| *E21B 43/04* | (2006.01) | |
| *E21B 43/08* | (2006.01) | |
| *F16K 31/122* | (2006.01) | |

(52) U.S. Cl.
CPC ............ *E21B 34/14* (2013.01); *E21B 34/063* (2013.01); *E21B 34/142* (2020.05); *E21B 43/04* (2013.01); *E21B 43/08* (2013.01); *F16K 3/265* (2013.01); *E21B 2200/06* (2020.05); *F16K 31/1223* (2013.01)

(58) Field of Classification Search
CPC ...... E21B 34/14; E21B 34/142; E21B 34/063; E21B 43/04; E21B 43/08; E21B 2200/06; F16K 3/265; F16K 31/001; F16K 31/1223
See application file for complete search history.

(56) References Cited

U.S. PATENT DOCUMENTS

| | | | |
|---|---|---|---|
| 8,453,736 B2 | 6/2013 | Constantine | |
| 8,794,330 B2 | 8/2014 | Stout | |
| 9,765,595 B2 | 9/2017 | Themig et al. | |
| 2007/0163781 A1* | 7/2007 | Walker | E21B 43/08 166/313 |
| 2013/0153236 A1 | 6/2013 | Bishop | |
| 2015/0075768 A1 | 3/2015 | Wright et al. | |
| 2015/0369003 A1* | 12/2015 | Hajjari | E21B 29/002 166/373 |
| 2016/0194936 A1* | 7/2016 | Allen | E21B 34/12 166/305.1 |
| 2017/0175488 A1* | 6/2017 | Lisowski | E21B 23/08 |
| 2017/0356266 A1* | 12/2017 | Arackakudiyil | E21B 49/08 |
| 2018/0094508 A1 | 4/2018 | Smith et al. | |
| 2018/0128082 A1 | 5/2018 | Hollan et al. | |
| 2018/0223624 A1* | 8/2018 | Fripp | E21B 43/12 |
| 2018/0334882 A1* | 11/2018 | Brandsdal | E21B 33/1208 |
| 2019/0136666 A1 | 5/2019 | Kent | |

* cited by examiner

*Primary Examiner* — Christopher J Sebesta
(74) *Attorney, Agent, or Firm* — Scott Richardson; Parker Justiss, P.C.

(57) ABSTRACT

A multi-functional well completion apparatus and method of operation thereof that offers the ability, in a single trip and with limited running tool manipulation, to perform downhole completion operations, such as gravel pack operations or sand control frac or other fluid stimulation operations is described. The well completion tool has multiple functions or operational positions by using a self-closing time delay valve without the need of service tools, thereby saving rig time, reducing operating costs and operational risks associated with tripping service tools into and out of a wellbore.

20 Claims, 17 Drawing Sheets

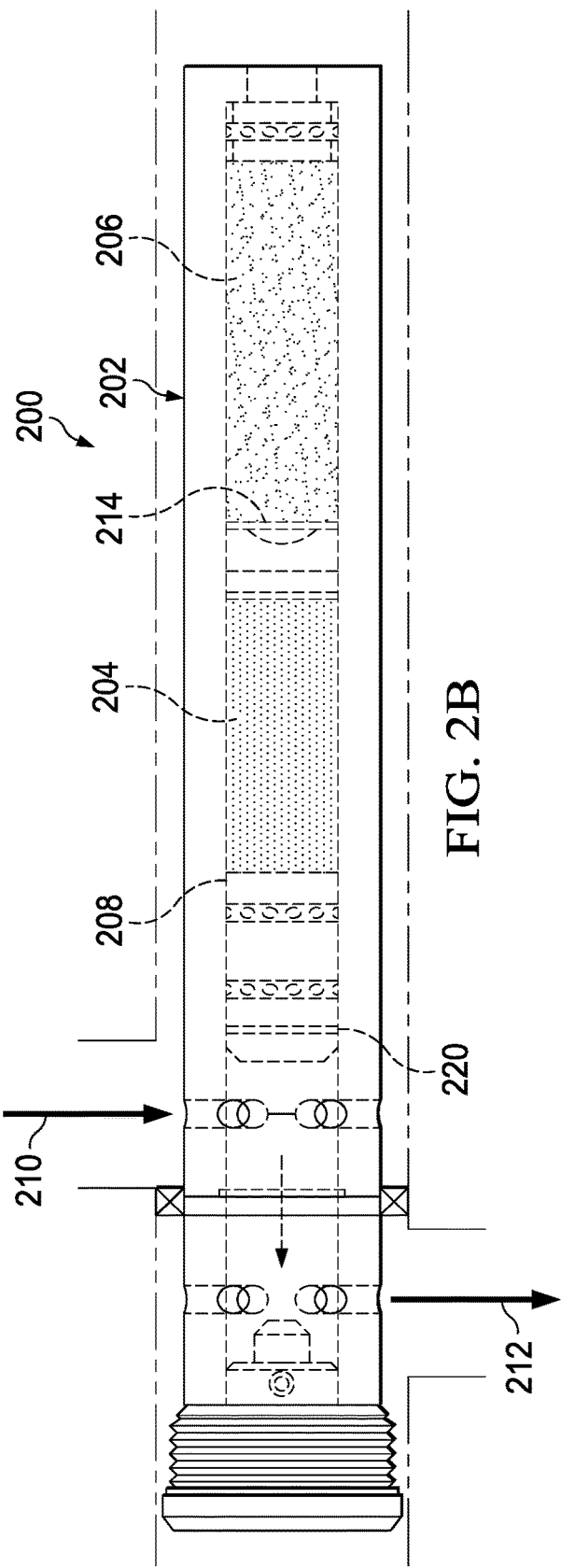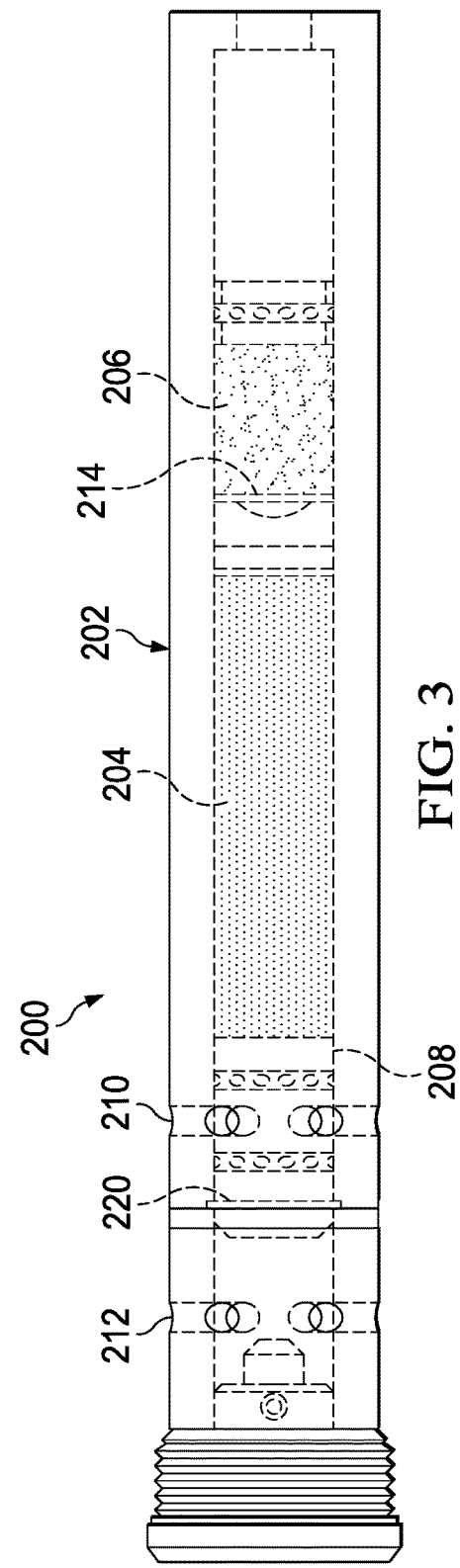

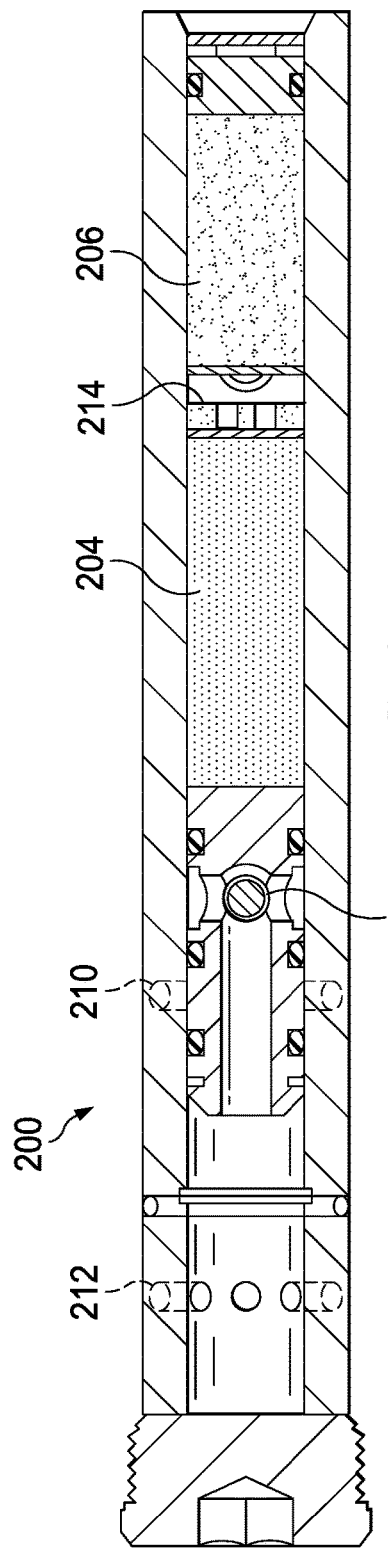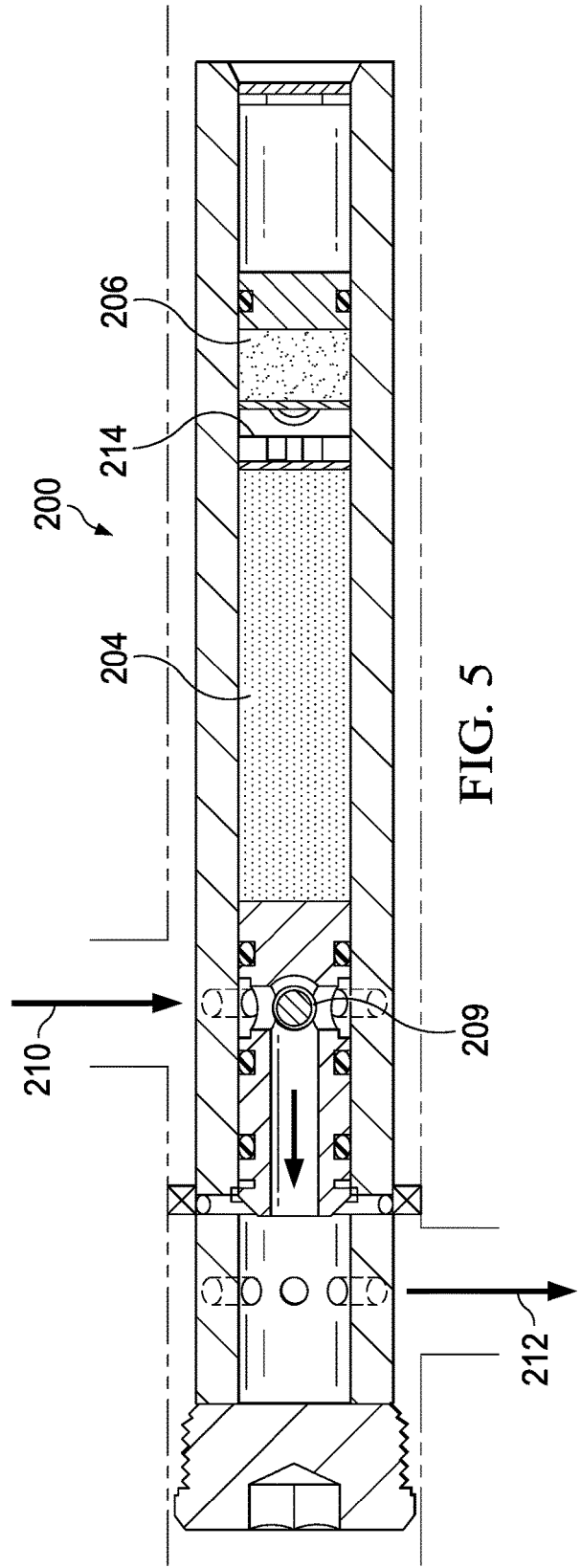

MULTIPLE SYSTEM PORTS USING A TIME DELAY VALVE

BACKGROUND

Completion assemblies, such a gravel pack assemblies and frac pack assemblies are commonly used in oil field well completions. A frac pack assembly is used to stimulate well production by using liquid under high pressure pumped down a well to fracture the reservoir rock adjacent to the wellbore. Propping agents suspended in the high-pressure fluids (in hydraulic fracturing) are used to keep the fractures open, thus facilitating increased flow rates into the wellbore. Gravel pack completions are commonly used for unconsolidated reservoirs for sand control. Gravel packs can be used in open-hole completions or inside-casing applications. An example of a typical gravel pack application involves reaming out a cavity in the reservoir and then filling the well with sorted, loose sand (referred to in the industry as gravel). This gravel pack provides a packed sand layer in the wellbore and next to the surrounding reservoir producing formation, thus restricting formation sand migration. A slotted or screen liner is often run in the gravel pack which allows the production fluids to enter the production tubing while filtering out the surrounding gravel. However, though these completion systems have seen extensive use in the oil field industry, they require a number of trips into the well to install the completion tools and perform operations, which translates into increased risk, time, and costs.

BRIEF DESCRIPTION

Reference is now made to the following descriptions taken in conjunction with the accompanying drawings, in which:

FIG. 2B and FIG. 3 are side views of a portion of a time delay valve with a piston moving from an open position to a closed position according to some aspects of the present disclosure;

FIG. 4 and FIG. 5 are cross-sectional views of a portion of a time delay valve with a piston moving from a closed position to an open position according to some aspects of the present disclosure;

DETAILED DESCRIPTION

Figure 1:
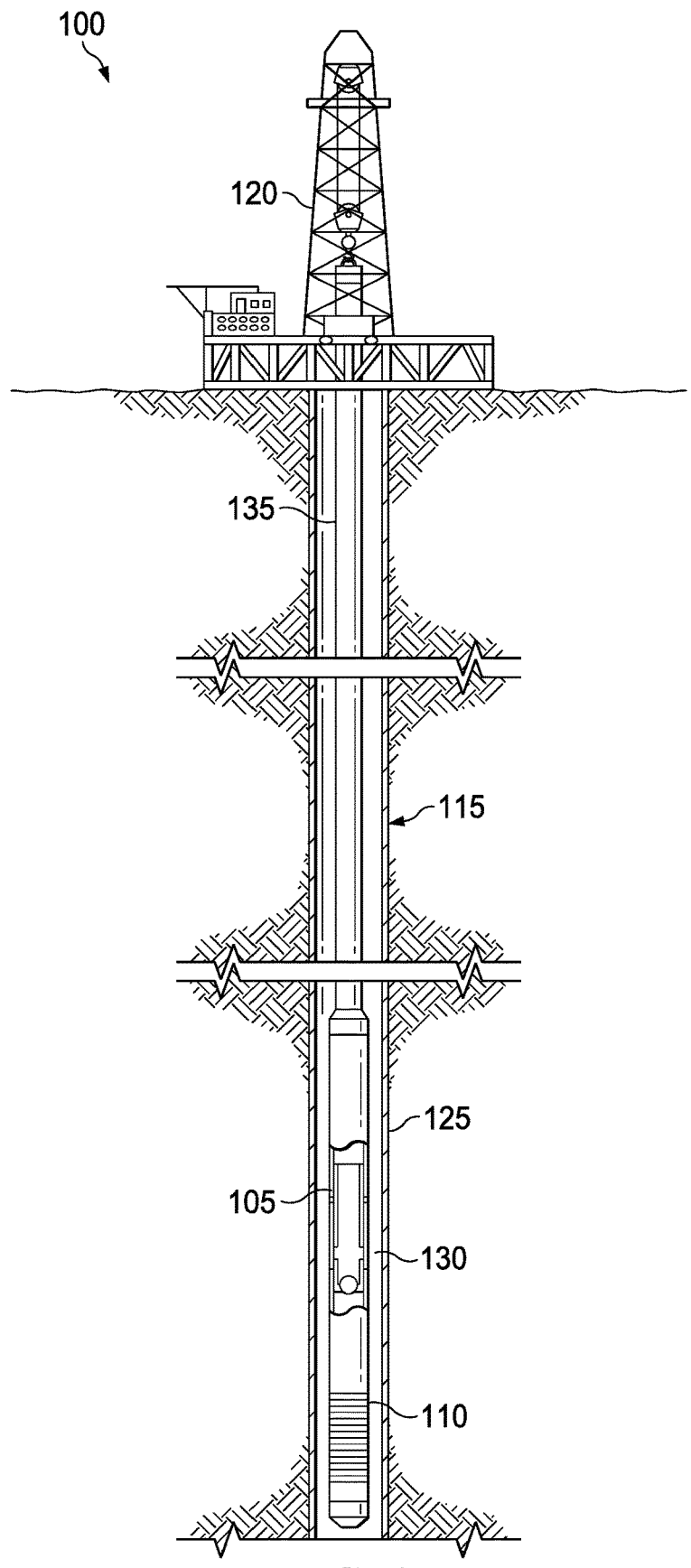
FIG. 1 illustrates a schematic view of a well system in which the time delay valve integrated into a completion tool may be implemented.

Provided is a multi-functional well completion apparatus and method of operation thereof that offers the ability, in a single trip and with limited running tool manipulation, to perform downhole completion operations, such as gravel pack operations or sand control frac or other fluid stimulation operations. This disclosure provides embodiments of completion tool having multiple function or operational positions by using a self-closing time delay valve without the need of service tools, thereby saving rig time, reducing operating costs and operational risks associated with tripping service tools into and out of a wellbore. Without the need of a service tool or control lines, surface or downhole operations can be implemented to open the time delay valve, which then remains open for a predetermined amount of time during which a downhole operation can be conducted. Without further intervention, the time delay valve then closes upon the lapse of the prescribed amount of time, which allows for additional downhole operations to be conducted.

In the drawings and descriptions that follow, like parts are typically marked throughout the specification and drawings with the same reference numerals, respectively. The drawn figures are not necessarily to scale. Certain features of this disclosure may be shown exaggerated in scale or in somewhat schematic form and some details of conventional elements may not be shown in the interest of clarity and conciseness. Specific embodiments are described in detail and are shown in the drawings; with the understanding that they serve as examples and that, they do not limit the disclosure to only the illustrated embodiments. Moreover, it is fully recognized that the different teachings of the embodiments discussed, below, may be employed separately or in any suitable combination to produce desired results.

Unless otherwise specified, any use of any form of the terms "connect," couple," or any other term describing an interaction between elements includes not only direct connection, unless specified, but indirect connection or interaction between the elements described, as well. As used herein and in the claims, the phrase "configured" means that the recited elements are connected either directly or indirectly in a manner that allows the stated function to be accomplished. These terms also include the requisite physical structure(s) that is/are necessary to accomplish the stated function.

In the following discussion and in the claims, the terms "including" and "comprising" are used in an open-ended fashion, and thus should be interpreted to mean "including, but not limited to." Further, references to up or down are made for purposes of description purposes only and are not intended to limit the scope of the claimed embodiments in any way, with "up," "upper," or "uphole," meaning toward the surface of the wellbore and with "down," "lower," "downward," "downhole," or "downstream" meaning toward the terminal end of the well, as the multi-functional well completion assembly would be positioned within the wellbore, regardless of the wellbore's orientation. Further, any references to "first," "second," etc. do not specify a preferred order of method or importance, unless otherwise specifically stated, but such terms are for identification purposes only and are intended to distinguish one element from another. For example, a first element could be termed a second element, and, similarly, a second element could be termed a first element, without departing from the scope of the embodiments of this disclosure. Moreover, a first element and second element may be implemented by a single element able to provide the necessary functionality of separate first and second elements.

FIG. 1. Illustrates a well completion system 200 in which one or more of the embodiments of a well completion apparatus 105, according to this disclosure, may be implemented. FIG. 1 illustrates two multi-functional well completion apparatus 105, 110, positioned in a wellbore 115 and across from a zone of interest, such as a geological formation that may contain oil or gas, which is hereinafter referred to as a "zone." Though only two multi-functional well completion assemblies are illustrated, more than two multi-functional well completion assemblies may be placed in the wellbore with each being placed across from a zone. As discussed below, the multi-functional well completion assemblies 105, 110 may be operated sequentially. For example, once the first zone is stimulated, the next zone, whether uphole or downhole from the first zone may be stimulated, until all of the zones are stimulated, all of which may be accomplished without the need for multiple trips into and out of the wellbore 115 or moving the string of tubing 135 considerably. The well completion system 100 includes a conventional rig 120, which may be a sea drilling platform or a land platform or work-over rig. At this stage of the drilling operations, a casing 125 has been inserted into the wellbore 115 and cemented into place, which forms a well annulus 130. However, the embodiments according to this disclosure may be used in open hole operations, as well. By way of convention in the following discussion, though FIG. 1 depicts a vertical wellbore, it should be understood by those skilled in the art that embodiments of the apparatus according to the present disclosure are equally well suited for use in wellbores having other orientations including horizontal wellbores, slanted wellbores, multilateral wellbores or the like. Additionally, though a drilling rig 120 is shown, those skilled in the art understand that a work-over rig or truck equipped with a coil tubing or wire line may also be used to operate the embodiments of the apparatus according to the present disclosure. The drilling rig 120 supports a string of tubing 135, which is coupled to the multi-functional well completion assemblies 105, 110. The multi-functional well completion assembly 105 utilizes embodiments of a time delay valve, as explained below.

The embodiments disclosed herein use a time delay valve that uses a piston, moveable by a reaction with a reaction material with a fluid either stored in or supplied to the time delay valve, to open, close or restrict one or more flow paths through the time delay valve to provide an intervention-less valve that is self-closing within the a desired time frame. The reaction material as used herein and in the claims means any material that interacts with a reactant fluid to cause either a volumetric change or a chemical process that produces a chemical by-product that can cause the piston to move within the time delay valve. Likewise, a reactant fluid as used herein and in the claims is any fluid that interacts with the reaction material to cause a volumetric change in the reaction material or cause a chemical by-product that causes the piston to move within the time delay valve. For example, in one embodiment, reaction material is a swellable material, such as an elastomer, that swells in response to contacting a reactant fluid, such as a hydrocarbon-based fluid, either stored in or supplied to the time delay valve. In another embodiment, reaction material may be a material that produces a gas or other by-product of a chemical reaction that produces a pressure within the time delay valve to push the piston to a closed position. For example, the reaction material may be magnesium and the reactant fluid may be a fluid that includes water that can react with the magnesium to produce magnesium hydroxide. Any example may be one that includes the hydrolysis of aluminum, with aluminum being the reaction material and water being the reactant fluid by its reaction with water to form a Gibbsite, Bayerite, or Norstrandite, depending on the form, which produces a hydrogen gas that can act against the piston to push it in the desired direction.

This contrasts with traditional time delay valves. In such known devices, fluid is pumped down the wellbore to actuate the time delay valve. However, once the time delay valve has been run downhole, hydraulic lines connected to the time delay valve can be tangled or fluid pumped down a running string can leak, preventing or impeding actuation of the time delay valve. Improper or impeded actuation of the time delay valve can prevent proper completion and operation of the wellbore.

As presented in disclosure, a time delay valve can be actuated by a reaction of a fluid either stored in or supplied to the time delay valve with a well fluid that causes the reaction to either swell the material or produce a chemical by-product that pushes the piston to a closed position, such that it can be used in completion operations without the need of multiple service tools being used. In one embodiment where reaction material is a swell material, a reactant fluid may be stored in the time delay valve prior to running the time delay valve downhole in a wellbore. In such embodiments, the reactant fluid contained in the time delay valve can contact the elastomer, causing the elastomer to swell and move a piston within the time delay valve. The piston can move to seal, open, or restrict one or more flow paths through the time delay valve. In one embodiment, by including the reactant fluid in the time delay valve prior to running the time delay valve downhole, proper actuation can occur regardless of the fluids present or absent in the wellbore. Additionally, including the reactant fluid prior to running the time delay valve downhole allows the time delay valve to be deployed in wellbores where a traditional valve would otherwise fail. However, in other embodiments, the reactant fluid may be operational fluids within the tubing string or wellbore.

In some examples, the components of the time delay valve can include a volume of reactant fluid (e.g., an oil-based fluid) stored in or supplied to the time delay valve that interacts with a swellable elastomer (e.g., rubber), to cause the swellable material to swell and push the piston in the desired direction. In other embodiments, the reaction material chemically interacts with the reactant fluid that is either stored in or supplied to the time delay valve to produce a chemical by-product that forces the piston in the desired direction, such as the examples as noted above. In either of the embodiments, the piston isolates flow ports located on one end of the time delay valve when the time delay valve has been actuated by the reactant fluid. The time delay valve can also include seals to isolate the reaction material from the reactant fluid, a mechanism to limit the direction of the swell material (e.g., mesh or a plate), and a destructible barrier or other barrier (e.g., rupture plate, low melting alloy/eutectic, paraffin wax, etc.) to prevent the reactant fluid from contacting the swell material during storage.

The destructible barrier can be open prior to or during a run-in-hole configuration (e.g., either at a very low pressure to allow it to open during running via hydrostatic pressure, or a value above the bottom-hole pressure to allow the operator to start the swelling process by increasing the well pressure). Other barriers, in place of the destructible barrier, located between the reactant fluid and material can melt away at a temperature above the ambient surface temperature. The barrier can remain in place until it reaches a temperature near the bottom-hole temperature.

In response to the destructible barrier breaking, the reactant fluid can contact reaction material an react with it to either swell the material or produces a gas or chemical by-product to cause the swelled material or reaction by-products to expand and move the piston. The piston can move to open, close, or restrict one or more flow paths through the time delay valve.

The foregoing examples are illustrative and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 2A:
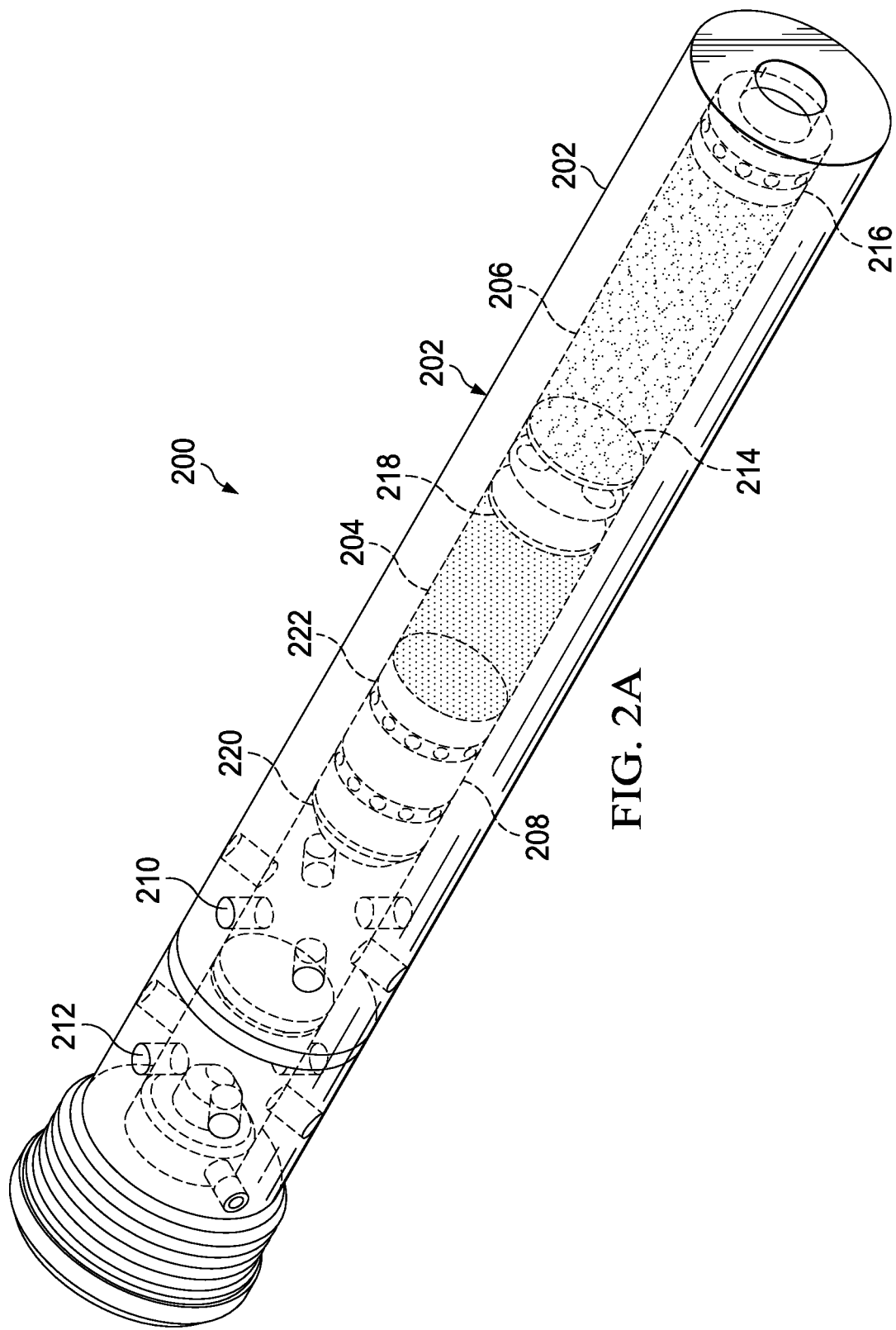
FIG. 2A is a perspective view of a time delay valve according to some aspects of the present disclosure.

FIG. 2A is a perspective view of a time delay valve 200 according to some aspects of the present disclosure. The time delay valve 200 can be used in a wellbore to open, close, or restrict one or more flow paths downhole. For clarity purposes, some portions of the time delay valve 200 are illustrated as transparent. The time delay valve 200 can be used as an inflow-control device (ICD) or as a device to establish a less restrictive flow path for use with an ICD, however, it should be appreciated that the time delay valve 200 can be used for other applications.

The time delay valve 200 includes a body 202 (e.g., a tubular body) containing reactive material 204, such as a swellable elastomer, or other material that can be exposed to a reactant fluid 206, such as a well fluid, that either swell the reactive material 204 or produces a gas or by-product that creates a pressure within the time delay valve and moves the piston to a closed position. An elastomer is a polymer with elastic properties. A swellable elastomer swells by at least 10% by volume when it contacts a liquid such as water or hydrocarbon fluid. Because of its elastic properties, the elastomer's swelling can be directed using obstructions that prevent swelling in some directions but permit swelling in other directions. The elastomer can swell in response to the reactant fluid 206. The reactant fluid 206 is contained in the body 202 in a reactant fluid chamber. In some examples, the reactant fluid 206 may be added to the body 202 prior to the time delay valve 200 being sent down the wellbore, while in other embodiments, the reactant fluid 206 within the wellbore or tubing string is forced into the body 202. The reactant fluid 206 can contact the reactive material, which begins to swell or react with the reactant fluid 206 as the time delay valve 200 travels down the wellbore.

The reactive material 204 either swells in response to or react with the reactant fluid 206 to move the piston 208. The reactive material 204 can cause the piston 208 to move from a first position (e.g., an open state) to a second position (e.g., a closed state). In the second position, the piston 208 can open, close, or restrict one or more flow paths through the time delay valve 200. In one embodiment the time delay valve 200 includes a flow path allows well fluid to travel from an inlet opening 210 through the body 202 to an outlet opening 212. In another embodiment, these inlet opening 210 and outlet opening 212 are not present, in that the reactant fluid flows axially through the time delay valve 200 to push the piston 208 up to seal a single exit port located on an end of the time delay valve to stop fluid flow through the time delay valve 200.

In some examples, a floating piston 216 can be positioned within the body 202 adjacent the reactant fluid 206. The floating piston 216 can move within the body 202 toward the reactant fluid 206. The floating piston 216 can aid in increasing the pressure in the reactant fluid 206 or increasing the speed or amount of reactant fluid 206 that contacts the reactive material 204. For example, the pressure in the wellbore can be increased, causing the floating piston 216 to move, increasing the pressure of the reactant fluid 206.

One or more rupture plates 214 are positioned between the reactant fluid 206 and the reactive material 204. The rupture plate 214 can remain intact and prevent the reactant fluid 206 from contacting the reactive material 204 until a predetermined condition has been met. Once the predetermined condition has been met, the rupture plate 214 can rupture, allowing the reactant fluid 206 to contact the reactive material 204. For example, the rupture plate 214 can rupture once the reactant fluid 206 has reached a certain pressure. Additionally, or alternatively, the rupture plate 214 can rupture in response to hydrostatic pressure in the wellbore, pressure in the wellbore above bottom-hole pressure, or increased temperature in the wellbore. In some examples, the destructible barrier can be compromised at the surface prior to running the time delay valve 200 down the wellbore.

A retainer plate 218 (e.g., a mesh disk) is mounted in the body 202 to restrict the swelling of the reactive material 204. For example, the retainer plate 218 can prevent the reactive material 204 from swelling in a direction away from the piston 208 and provides a reaction to axial swell forces. The retainer plate 218 can include holes or mesh that allows the reactant fluid 206 to flow through the retainer plate 218 and contact the reactive material 204.

In some embodiments, the piston 208 includes a snap ring 220 that holds the piston 208 in place and prevents axial movement. The snap ring 220 can be coupled with the piston and used to latch into a groove in the body 202. The snap ring 220 can hold the piston 208 in place before or after movement. For example, the snap ring 220 can hold the piston 208 in place after the piston 208 has moved from the first position to the second position. Additionally, or alternatively, the piston 208 includes one or more O-rings 222 that help hold the piston 208 in position. For example, O-rings 222 can prevent the piston 208 from moving before the reactive material 204 has swollen. Other means of holding the piston in position may include bonding the piston to the elastomer or by mechanical fasteners.

FIGS. 2B and 3 illustrate a time delay valve 200 with a piston 208 changing a flow path from an open position to a closed position. For clarity, FIGS. 2B and 3 are discussed with reference to time delay valve 200 and associated components described in FIG. 2A, but other implementations and components are possible. Turning to FIG. 2B, the flow path is in an open position. The rupture plate 214 is still intact and preventing the reactant fluid 206 from contacting the reactive material 204. The reactive material 204 is in an unreacted state, and thus, has not moved the piston 208 to change the flow path from the open position. In the open position, the flow path allows well fluid to flow from the inlet opening 210 through the body 202 to the outlet opening 212.

FIG. 3 shows the flow path in a closed position. The rupture plate 214 has ruptured, for example, from increased heat or pressure in the wellbore. Reactant fluid 206 has flowed past the ruptured rupture plate 214 and contacted the reactive material 204. The reactive material 204 has either swollen or produced a by-product that has moved the piston 208 to change the flow path from the open position to the closed position. In the closed position, well fluid can no longer flow through the inlet opening 210. A snap ring 220 can prevent the piston 208 from changing the flow path from the closed position.

FIGS. 4 and 5 illustrate a time delay valve 200 with a piston 208 changing the flow path from a closed position to an open position. As with FIGS. 2B and 3, references are made to time delay valve 200 and associated components described in FIG. 2A, but other implementations and components are possible. In FIG. 4, the rupture plate 214 is still intact, the reactant fluid 206 has not contacted the reactive material 204. The flow path is in the closed position and prevents well fluid from entering the inlet opening 210.

In FIG. 5, the rupture plate 214 has ruptured, allowing the reactant fluid 206 to contact the reactive material 204. The reactant fluid 206 has reacted with the reactive material 204 to either swell the reactive material or create a by-products, such as a gas to move the piston 208 to change to flow path to the open position. The piston 208 can include an opening 209 allowing fluid to flow through the piston 208 when the flow path is in the open position. In the open position, well fluid can flow from the inlet opening 210, through the piston opening 209, to the outlet opening 212. A snap ring 220 can hold the piston 208 preventing the piston 208 from changing the flow path from the open position, allowing well fluid to flow through the time delay valve 200.

Some examples of the present disclosure can overcome one or more of the above-mentioned issues by implementing one or more of the following processes. Some examples can include more, fewer, or different steps than those described below. Also, some examples can implement the steps of the process in a different order. For clarity, the following processes are discussed with respect to the embodiment shown in FIG. 2, but other implementations are possible.

Reactant fluid 206 can be separated from a reactive material 204. The reactant fluid 206 and reactive material 204 can be contained in the body 202 of a time delay valve 200. The reactant fluid 206 and reactive material 204 can be separated by one or more rupture plates 214. When intact, the rupture plate 214 can prevent the reactant fluid 206 from contacting the reactive material 204. After rupturing, the rupture plate 214 can allow the reactant fluid 206 to contact the reactive material 204. The time delay valve 200 can be deployed in a wellbore. The time delay valve 200 can include the reactant fluid 206 in the body 202. The body 202 can protect the other components of the time delay valve 200 in the wellbore. The time delay valve 200 can travel downhole in the wellbore until it reaches some predetermined depth, which can be determined by the pressure or heat in the wellbore. Once the predetermined depth is reached, the rupture plate 214 can rupture allowing the reactant fluid 206 to contact the reactive material 204.

In one embodiment, the reactive material 204 can expand after contacting the reactant fluid 206, or in another embodiment, the reactive material 204 produces a by-product that creates a pressure within the time delay valve 200. The reactant fluid 206 can contact the reactive material 204 after the rupture plate 214 has ruptured. Additionally, or alternatively, the reactant fluid 206 can contact the reactive material 204 after being manually released by a user. After the reactant fluid 206 contacts the reactive material 204. The reactive material 204 can expand in one or more directions within the body 202. The body 202 and a retainer plate 218 can reduce or prevent the reactive material 204 from expanding in a direction away from a piston 208.

In some embodiments, no rupture plate 214 is used and the reactant fluid 206 can be loaded in the body 202 and contact the reactive material 204 prior to the time delay valve 200 being deployed in a wellbore. The reactive material 204 can swell while the time delay valve 200 travels downhole in the wellbore until it reaches the predetermined depth. The reactive material 204 can be in the fully swollen state once it reaches the predetermined depth or can continue to swell. The reactive material 204 can expand and apply a force to the piston 208, causing the piston 208 to move. After moving, the piston 208 can open, close, or restrict one or more flow paths through the time delay valve 200. For example, the piston 208 can move from a first position to a second position. In the first position, the piston 208 can open the flow path and allow well fluid to flow through an inlet opening 210 through the body 202 to an outlet opening 212. In the second position, the piston 208 can close the flow path and block the inlet opening 210 and prevent the well fluid from entering the body 202. However, the piston 208 can include a piston opening 209, such that, in the first position, the piston 208 can close the flow path and block well fluid from flowing into the inlet opening 210 and in the second position, the piston 208 can open the flow path and well fluid can flow in the inlet opening 210, through the piston opening 209, to the outlet opening 212.

The piston 208 can be locked in place after it has moved from the first position to the second position. The piston 208 can be locked in place using a snap ring 220, an O-ring 222, or a combination of a snap ring 220 and an O-ring 222. The snap ring 220 can lock into a groove in the body 202 to prevent the piston 208 from moving in an axial direction. The piston 208 can be locked in place to prevent well fluid from entering the inlet opening 210 or allow well fluid to enter the inlet opening 210.

Figure 6A:
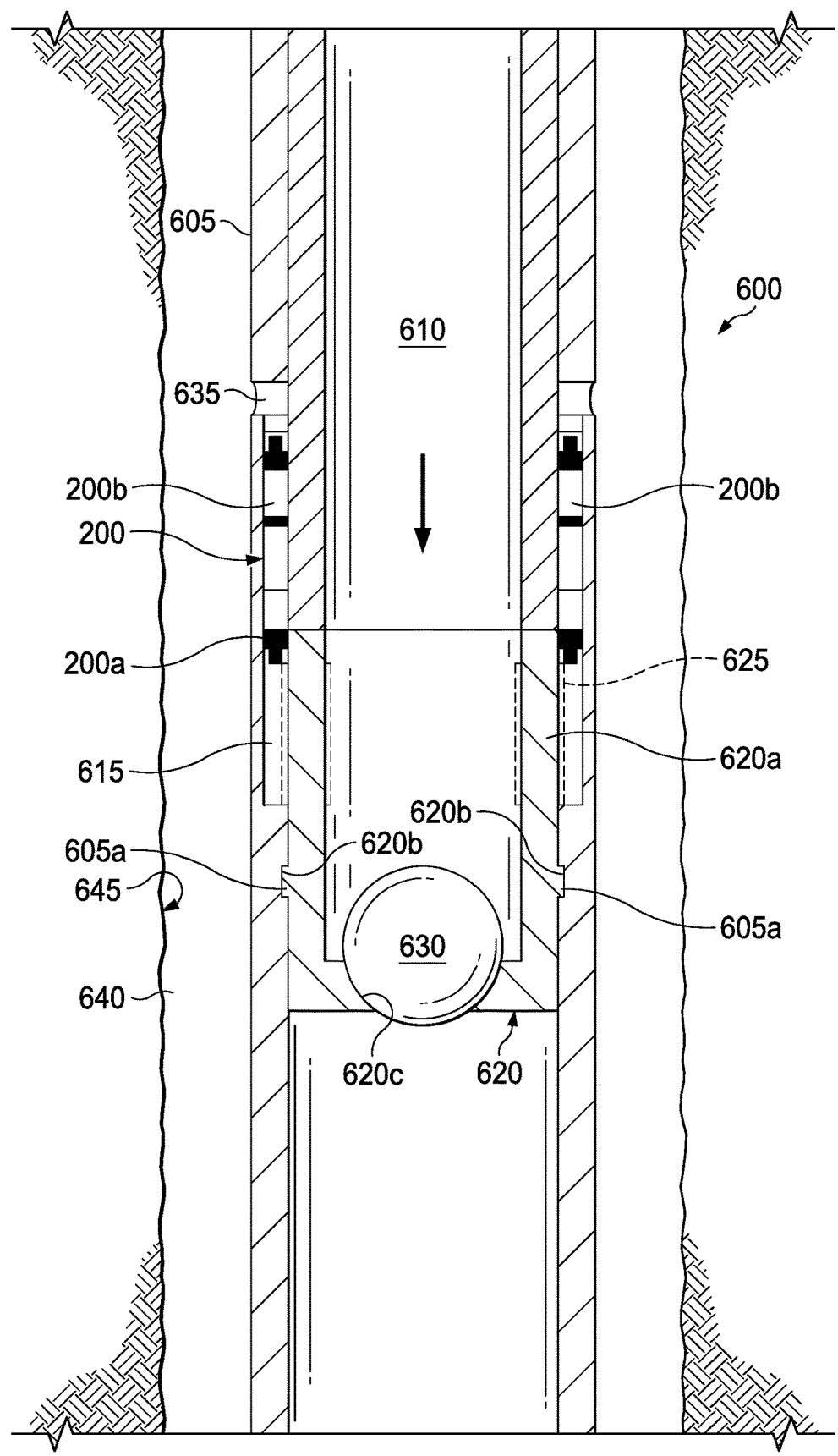
FIGS. 6A-6D illustrate sectional views of one embodiment of a completion tool in which a time delay valve may be implemented.

FIG. 6A is a schematic view that illustrates one embodiment of a completion tool 600 in which the various embodiments of the time delay valve 200, as described above, may be implemented. This embodiment includes a tubular housing 605 that has an interior fluid pathway 610, and a valve chamber 615 that is located within a side wall of the tubular housing 605. In the embodiment where the reactant fluid is contained within the time delay valve 200, as discussed above, the time delay valve 200 is positioned within the valve chamber 615 so that fluid can flow through the ports 200b of the time delay valve 200. In the embodiment where the ports 200b are not present and the reactant fluid is provided through the well fluid, the well fluid flows axially around and through the time delay valve 200 and through an exit port located in the uphole end of the time delay valve 200, which closes fluid flow through the time delay valve 200, and thus, closes fluid flow through the valve chamber 615. The seals and fabrication and assembly processes associated therewith may be any known material, configuration, or process. A valve gate 620, which in this embodiment is a sliding sleeve 620a, is located within the tubular housing 605. The sliding sleeve 620a in one embodiment may be a known collet that has fingers with side protrusions 620b that can be received within a corresponding notch or notches 605a in an interior wall of the tubular housing 605. Upon the application of the appropriate pressure, the protrusion 620b of the collet will release from corresponding notch(s) 605a, which allow the sliding sleeve 620a to move axially downhole to another locked position. This feature provides the ability to have multiple completion operations along the same string without tripping into and out of the wellbore. The sliding sleeve 620a is actuatable to open an interior port 625, shown in dashed lines, between the valve chamber 615 and the interior fluid pathway 610 of the tubular housing 605 to actuate the time delay valve 200. In one embodiment, the sliding sleeve 620a may be initially held in place by a shear pin (not shown), or it may be held in place by the protrusions 620b being received in the corresponding notch(s) 605a. In this embodiment, the time delay valve 200 is oriented in the valve chamber 615 such that the well fluid enters the valve chamber 615 from the downhole end 200a of the time delay valve 200. At this point, the time delay valve 200 is in an open position. The time delay valve 200 may be opened prior to or after the placement of the completion tool's 600 within a wellbore. As explained below, in this embodiment, the sliding sleeve 620a is slid axially downhole to open the interior port 625. In one aspect, the sliding sleeve 620a includes a ball seat 620c that is configured or sized to receive a sealing ball 630 thereon. The sliding sleeve 620a and the sealing ball 630 work in a known manner in that the sealing ball 630 seals against the ball seat 620c to allow enough of a pressure build up against the ball 630 to slide the sliding sleeve 620a downhole to open the interior port 625. However, in other embodiments, the sliding sleeve 620a may be rotated within the interior fluid pathway 610 to open the interior port 625, where no sealing ball is needed. Though collet sliding sleeves are shown and discussed, other known valve gate mechanisms may be used to open the interior port. In one aspect, the illustrated embodiment further comprises an exterior port 635 located within the sidewall of the tubular housing 605 and uphole of the time delay valve 200 that is fluidly connectable to the valve chamber 615 through the interior port 625, such that when the interior port 625 is opened, the well fluid flows into the valve chamber 615, and either through time delay valve 200 or through the ports 200b of the time delay valve 200 and out of the tubular housing 605 and into an annulus 640 of a wellbore 645. The pressure of the well fluid is sufficient to cause the time delay valve 200 to actuate, as discussed above. In the embodiment where the reactant fluid is the well fluid, the well fluid enters the delay valve 200 through a port located at its downhole end, as generally shown. The well fluid reacts with the reaction material to cause a chemical reaction that creates a by-product, which exerts a force against the piston to move it to a closed position. If the time delay valve 200 includes the reactant fluid stored within the time delay valve 200, the pressure forces the stored fluid to contact the reaction material that either causes the reaction material to swell, which moves the piston or causes the previously mentioned chemical reaction.

Figure 6B:
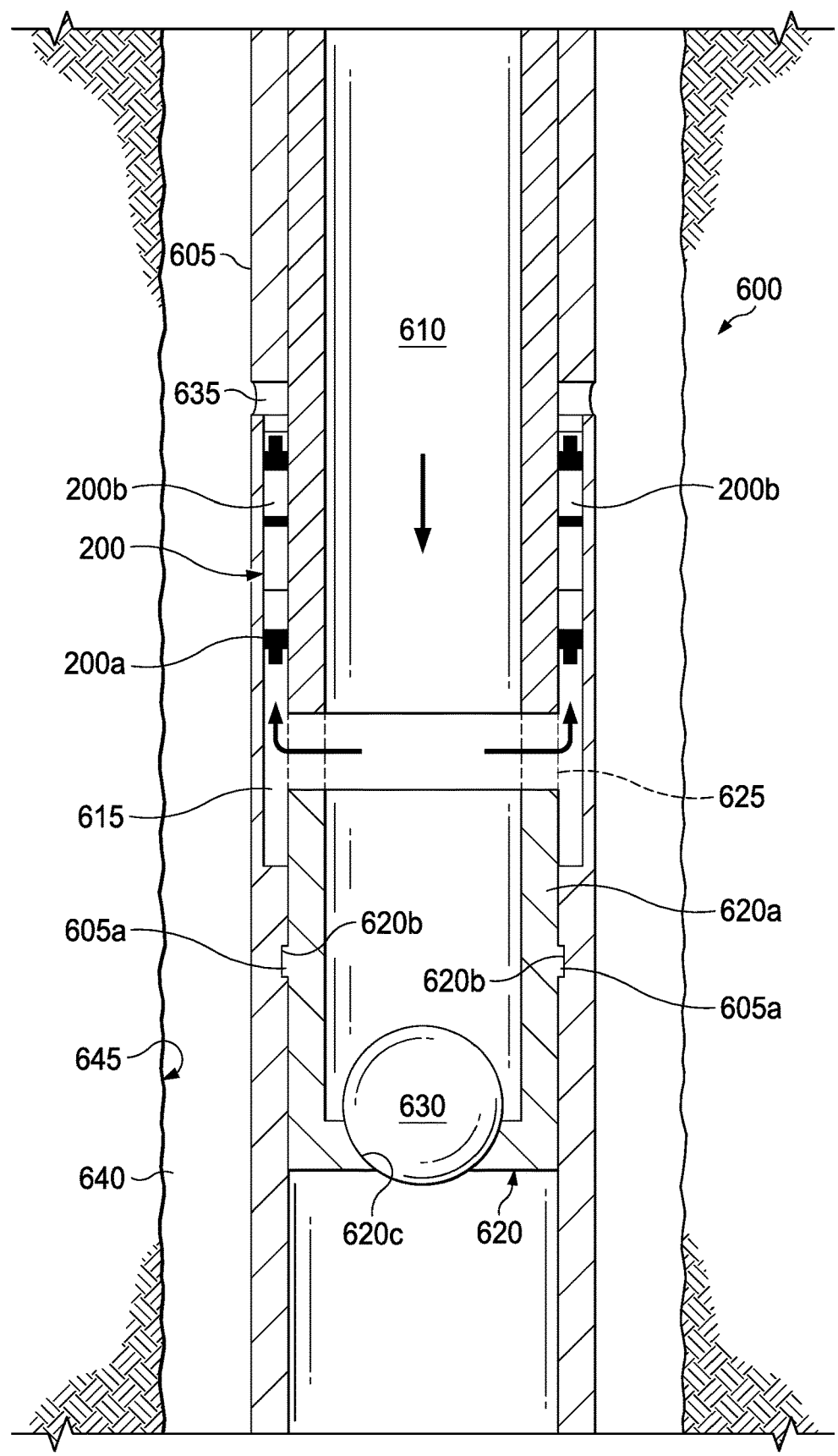

FIG. 6B illustrates the embodiment of FIG. 6A following a pressure up on the seated ball 630. The fluid pressure against the seated ball 630 forces the sliding sleeve 620a to move downhole, which opens interior port 625. The fluid within the interior fluid passageway 610 is then allowed to flow into the valve chamber 615. At this point of operation, the time delay valve 200 is open and a reactant fluid, whether from within the time delay valve 200 itself, or as provided from the well fluid, activates the time delay valve 200 in a manner as described above.

Figure 6C:
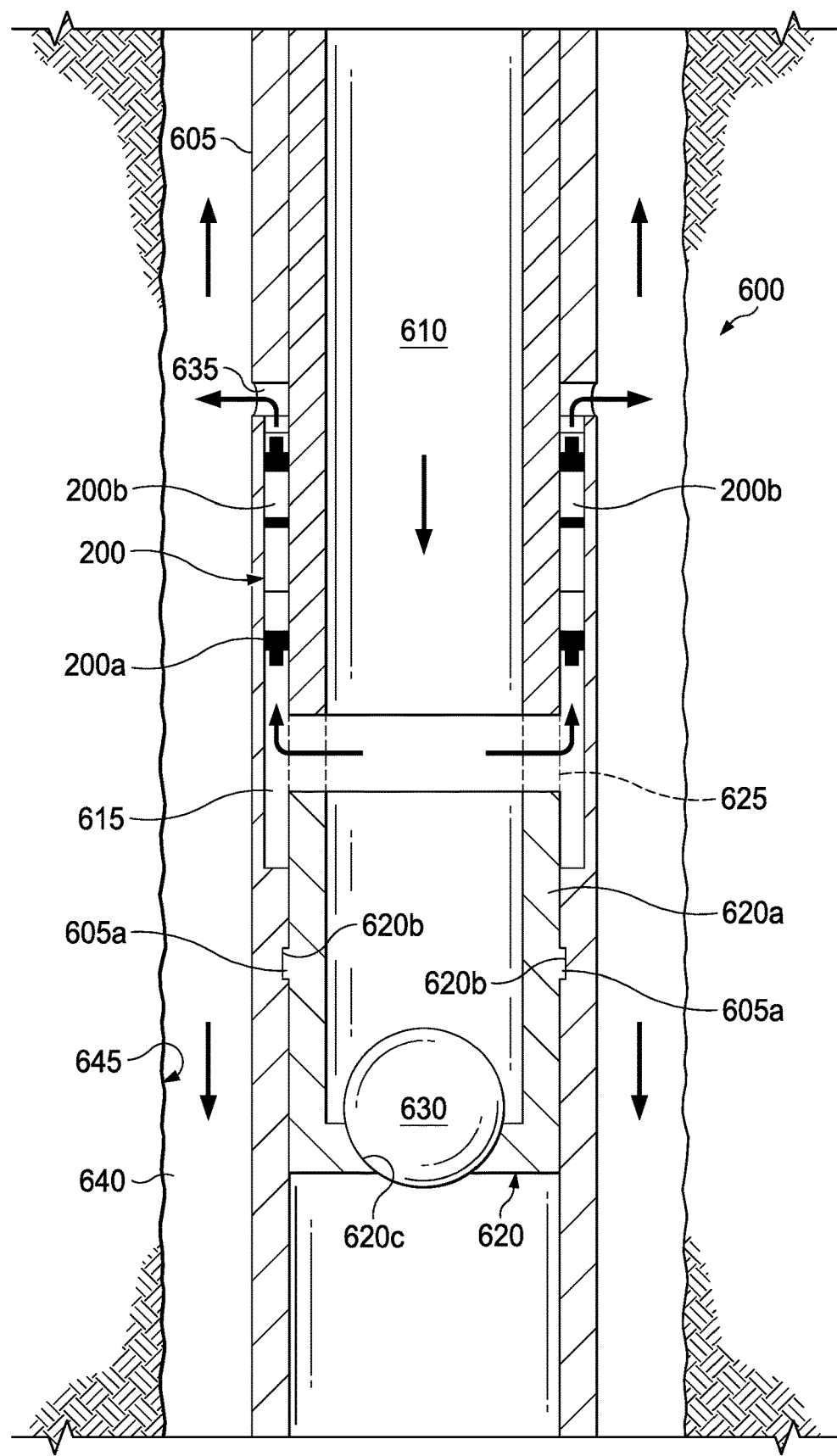

FIG. 6C illustrates the embodiment of FIG. 6B illustrating a fluid flow exiting the valve chamber 615 by way of the time delay valve 200, in a manner as discussed above. As generally shown, the fluid travels through the valve chamber 615 by way of the time delay valve 200, as discussed above, and exits the completion tool 600 through the exterior port 635 and enters the well annulus 640. The zone of interest is isolated by packers that are not shown in this view. Thus, the fluid can flow into the target geological zone. For example, if the operation is a frac operation, the proppant would flow from the completion tool 600 and into the target zone. If the operation is a gravel pack, then the fluid flow would flow through the gravel pack assembly and pack the screen. The time delay valve 200 would remain open for the predetermined amount of time. As discussed above, the amount of time can be set to complete the intended operation and can vary from hours to several days before the valve closes without further intervention. When the time delay valve 200 closes, it shut off the fluid flow into the annulus 640, which allows a pressure-up process to be used within the interior fluid pathway 610 to slide the sliding sleeve 620a to a downhole position so that additional completion operations can be conducted without the time and expense associated with tripping different tools into and out of the wellbore.

Figure 6D:
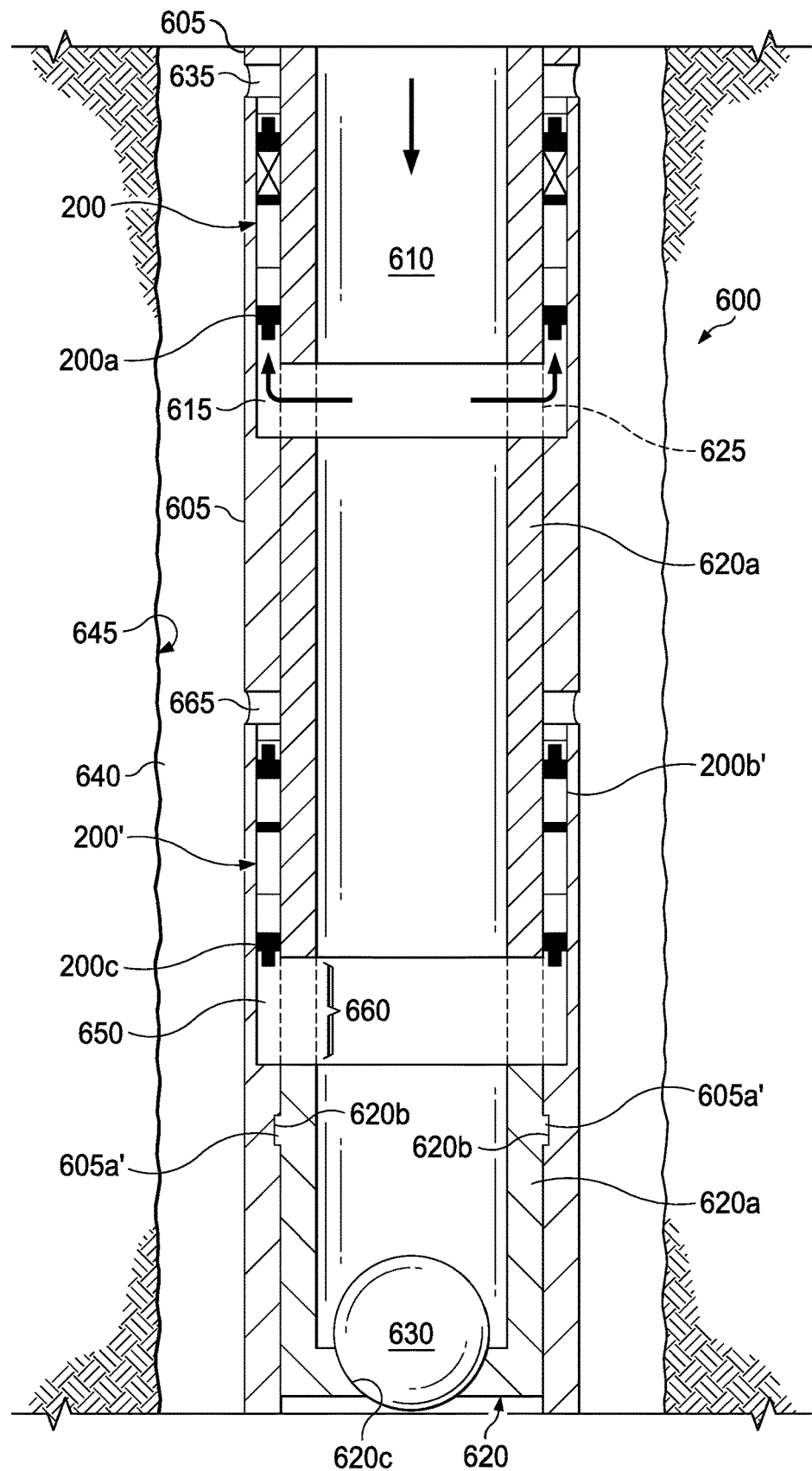

FIG. 6D illustrates an embodiment where the time delay valve 200 is arranged in a sequence with other components, as just discussed, along the length of the tubular housing 605 to allow for multiple, sequential completion operations. As mentioned above, after the prior completion operations have ended, the time delay valve 200 closes within the predetermined time period. This allows pressure to be applied against the sliding sleeve 602a to release the protrusions 620b from the notch(s) 605a' and applied against the sealing ball 630 to slide the sliding sleeve 620 downhole to a new operational position. The sliding action of the sliding sleeve 620a causes the protrusions 620b to engage notch(s) 605a' located downhole from the first completion zone and prevents the sliding sleeve 620a from moving any further downhole until sufficient pressure is once again applied to release the sliding sleeve 620a and move it to another position, if required.

FIG. 6D, accordingly illustrates an embodiment that further comprises a second operational assembly that can operate, as previously described. FIG. 6D shows the positional configuration of the components after downhole movement to a downhole position that opens interior port 660.

The illustrated embodiment of FIG. 6D comprises a time delay valve 200', the embodiments of which are described above. Though the time delay valve 200' may have similar construction to time delay valve 200, it may be configured to have a longer or shorter operational time before closing, depending on operational time requirements. The second completion components may be the same as those discussed above regarding FIG. 6C. Thus, in the illustrated embodiment, the second or sequential completion assembly comprises a valve chamber 650 that is located with the sidewall of the tubular housing 605 in which the time delay valve 200' is located. The tubular housing 605 is shown to be a unitary housing for both completion sections. However, in other embodiments, the second completion configuration may be contained within its own tubular housing that is coupled to the uphole tubular housing 605. As seen, the sliding sleeve 620a has been actuated to open an interior port 660. As with the uphole completion operation, as discussed above, the time delay valve 200' may be oriented in the valve chamber 650 such that the well fluid enters the time delay valve 200' or flows through the ports 200b' in the manner described above regarding other embodiments. The time delay valve 200' may be opened prior to or after the placement of the completion tool's 600 within the wellbore 645. As explained below, in this embodiment, the sliding sleeve 620a is slid axially downhole to open the interior port 660. However, in other embodiments, the sliding sleeve may be rotated within the interior fluid pathway 610 to open the interior port 660, where no sealing ball is needed. In one aspect, this embodiment further comprises an exterior port 665 located within the sidewall of the tubular housing 605 and uphole of the time delay valve 200' that is fluidly connectable to the valve chamber 650 through the interior port 660, such that when the interior port 660 is opened, the well fluid flows into the valve chamber 650 through the ports 200b' or through the time delay valve 200', as previously described regarding other embodiments, and out of the tubular housing 605 through the exterior port 665 and into the annulus 640 of the wellbore 645.

As with the prior completion operations, the zone of interest is isolated by packers that are not shown in this view. Thus, the fluid can flow into the target geological zone. For example, if the operation is a frac operation, the proppant would flow from the completion tool 600 and into the target zone. If the operation is a gravel pack, then the fluid flow would flow through the gravel pack assembly and pack the screen. For each completion operation, the time delay valve would remain open for the desired amount of time. As discussed above, the amount of time can be set to complete the intended operation and can vary from hours to several days before the time delay valve 200 closes. Upon the expiration of the predetermined amount of time, the time delay valve 200' closes. When the time delay valve 200' closes, it shuts off flow through the exterior port 665, which allows pressure to once again build up within the tubular housing 605. Thus, multiple completion operations can be conducted without the time and expense associated with tripping different tools into and out of the wellbore.

Figure 7A:
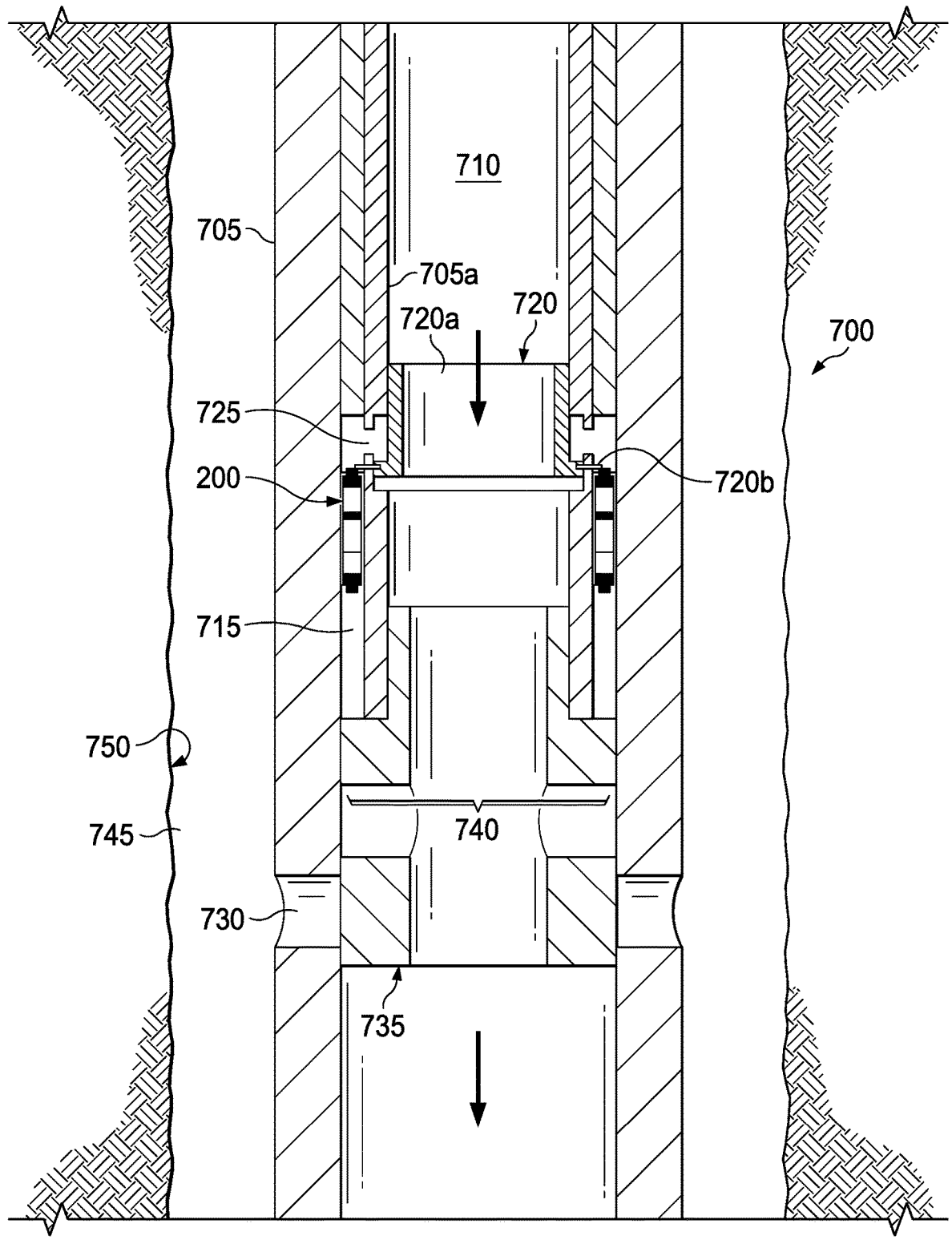
FIGS. 7A-7D illustrate sectional views of another embodiment of a completion tool in which a time delay valve may be implemented.

FIG. 7A illustrates another embodiment of a well completion tool 700. This embodiment comprises a tubular housing 705 that has an interior fluid pathway 710, and a valve chamber 715 in which an embodiment of the time delay valve 200, as discussed above, is located. A valve gate 720, which in this embodiment is a sliding sleeve 720a, is located within the tubular housing 705. In one embodiment, the sliding sleeve 720a is releasably coupled to an interior sleeve 705a located within the tubular housing 705 by a shear pin 720b. When a lifting force is applied with an interior sleeve 705a, the force shears the shear pin 720b, thereby allowing the sliding sleeve 720a to be moved uphole. The sliding sleeve 720a is actuatable to open an interior port 725 that fluidly connects the interior fluid pathway 200 with the valve chamber 715, when the sliding sleeve 720a is slid uphole to uncover the interior port 725. As with other embodiments, the time delay valve 200 may be open prior to or after the placement of the completion tool 700 within a wellbore.

In this embodiment, the tubular housing 705 has an exterior port 730 located downhole of the valve chamber 715 and the time delay valve 200. When opened, the exterior port 730 provides a fluid path from the interior fluid pathway 710, through the exterior port 730 and into an annulus of a wellbore. A second sliding sleeve 735 is located downhole from the sliding sleeve 720a and is slidable with the tubular housing 705. The sliding sleeve 735 has a horizontal passageway 740 that extends through it. As explained below, the sliding sleeve 735 is moveable between a first closed position and a second, downhole open position. When in the open position, the horizontal passageway 740 aligns with the exterior port 730 to allow fluid to flow from the interior fluid pathway 710, through the exterior port 730 and into an annulus of a wellbore.

Figure 7B:
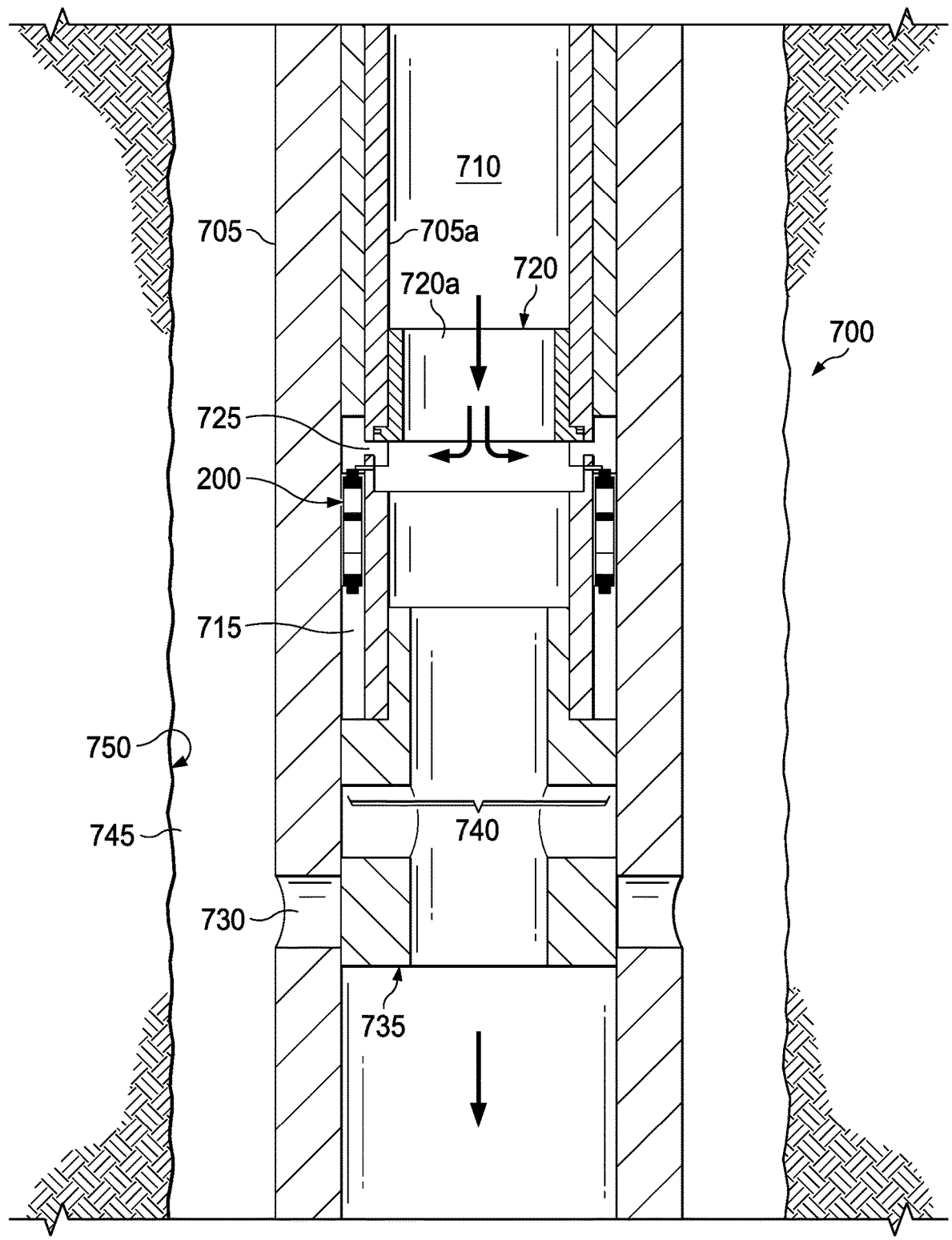

FIG. 7B illustrates the completion tool of FIG. 7A after the sliding sleeve 720 has been moved to an uphole position. The uphole position of the sliding sleeve 720a opens the interior port 725 that allows fluid from the interior fluid pathway 710 to flow through the interior port 725 and activate the time delay valve 200 in a manner as previously discussed regarding other embodiments. The fluid flows to the downhole end of the valve chamber 715 and creates a fluid pressure against a face of the sliding sleeve 735, as generally shown.

Figure 7C:
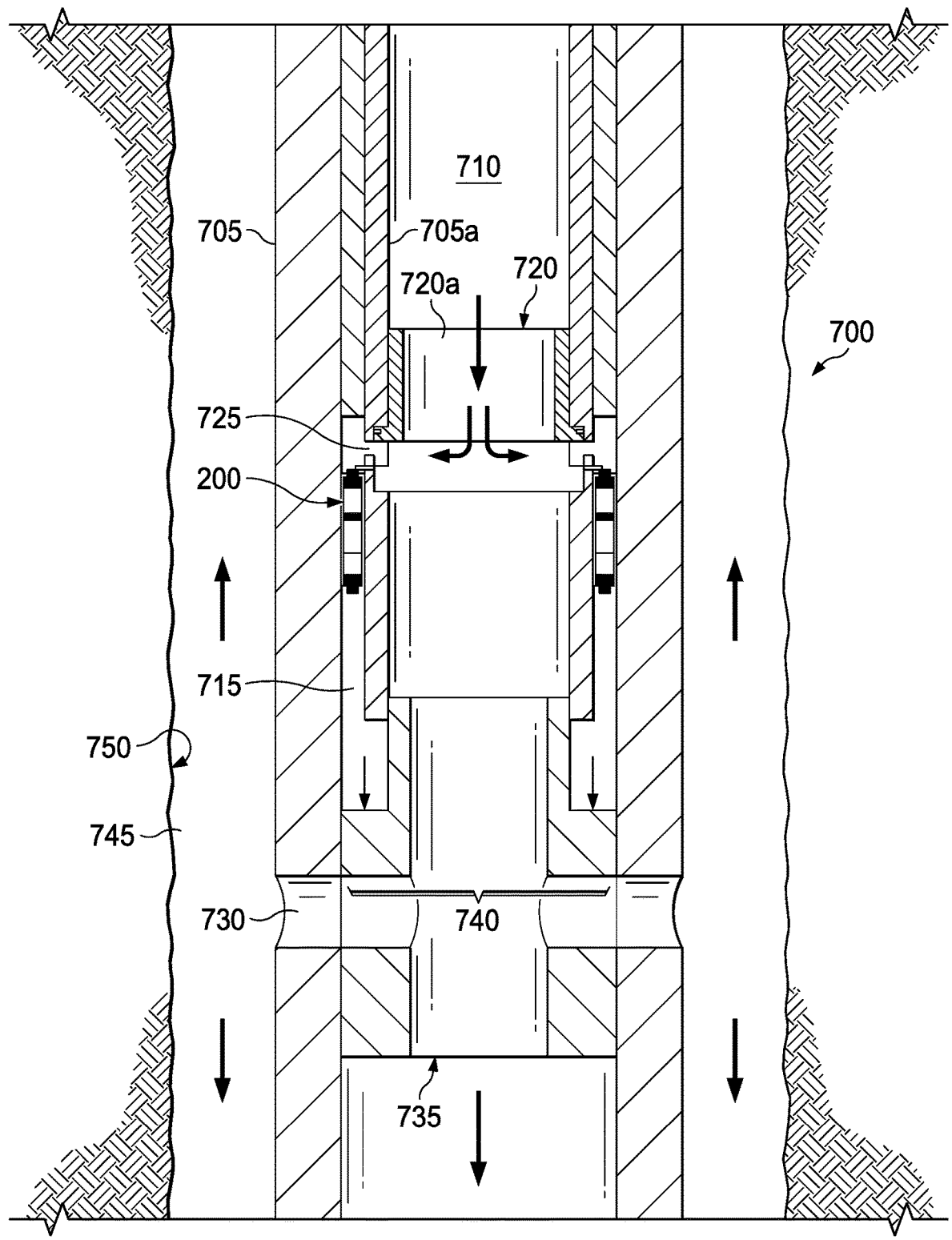
Figure 7D:
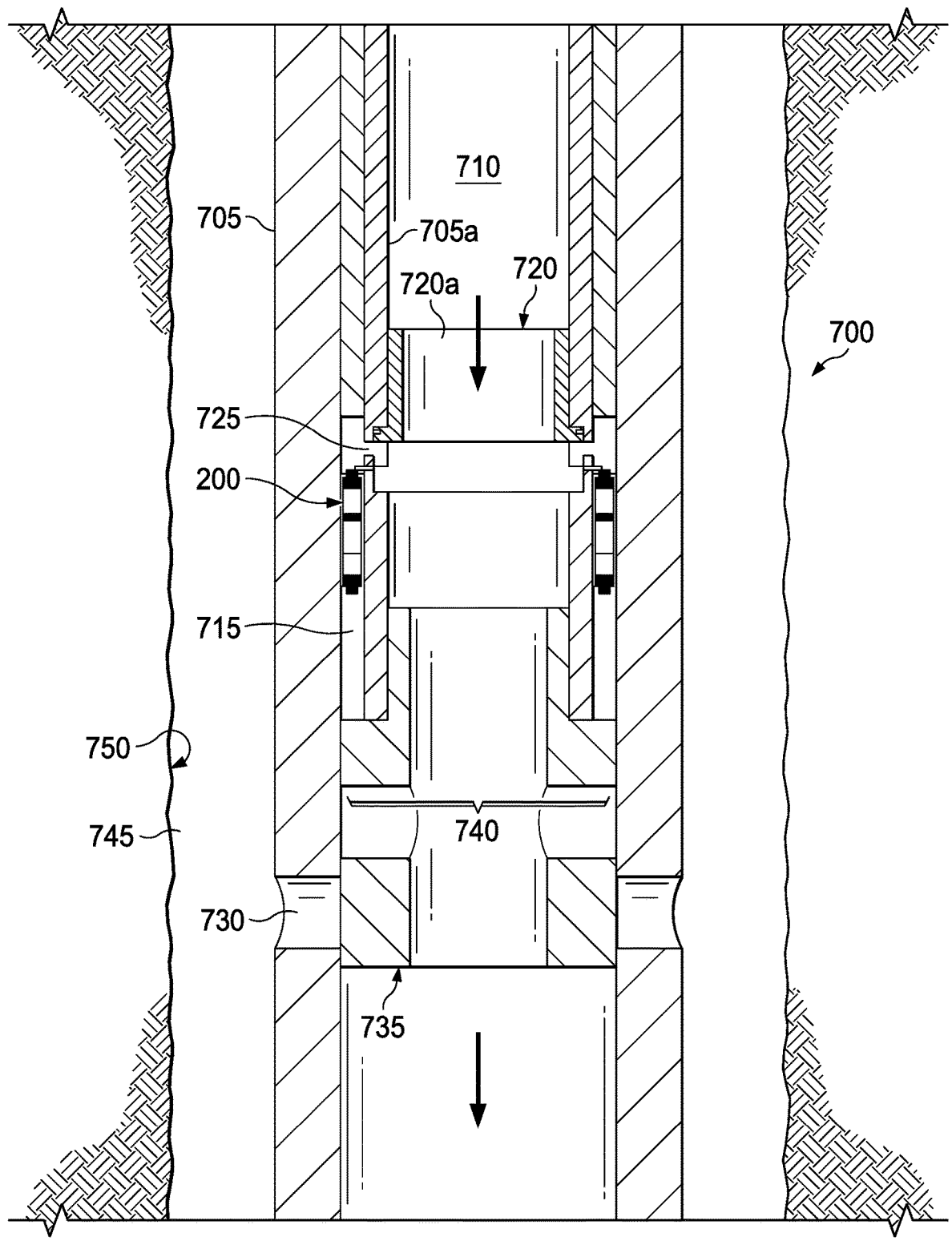

FIG. 7C illustrates the embodiment of FIG. 7B after the fluid pressure has moved the sliding sleeve 735 downhole to cause the horizontal passageway 740 to align with the exterior port 730. This port alignment provides a fluid path from the interior fluid pathway 710 into an annulus 745 of a wellbore 750, as shown. As with other embodiments, the zone of interest is isolated by packers that are not shown in this view. Thus, the fluid can flow into the targeted geological zone. For each completion operation, the time delay valve 200 remains open for the desired amount of time. As discussed above, the amount of time can be set to complete the intended operation and can vary from hours to several days before the time delay valve closes. Upon expiration of the predetermined amount of time, the time delay valve 200 operates in the manner discussed above to close the time delay valve 200. After the time delay valve 200 closes, the fluid pressure within the valve chamber 715 bleeds off through a bleed off port associated with the time delay valve 200, thereby relieving the pressure within the valve chamber 715. In one embodiment, the surface area of the sliding sleeve 735 against which fluid pressure is applied is larger than the surface area of the sliding sleeve 720a against which fluid pressure is applied. Due to this surface area differential, the sliding sleeve 735 moves uphole to its initial position, thereby closing the exterior port 730, as seen in FIG. 7D. As with previous embodiments, once the time delay valve 200 is closed, the completion tool 700 may comprise sequential time delay valves 200 positioned along multiple geological zones of interest that can be sequentially completed without the time and expense associated with tripping different completion tools into and out of the wellbore.

Figure 8A:
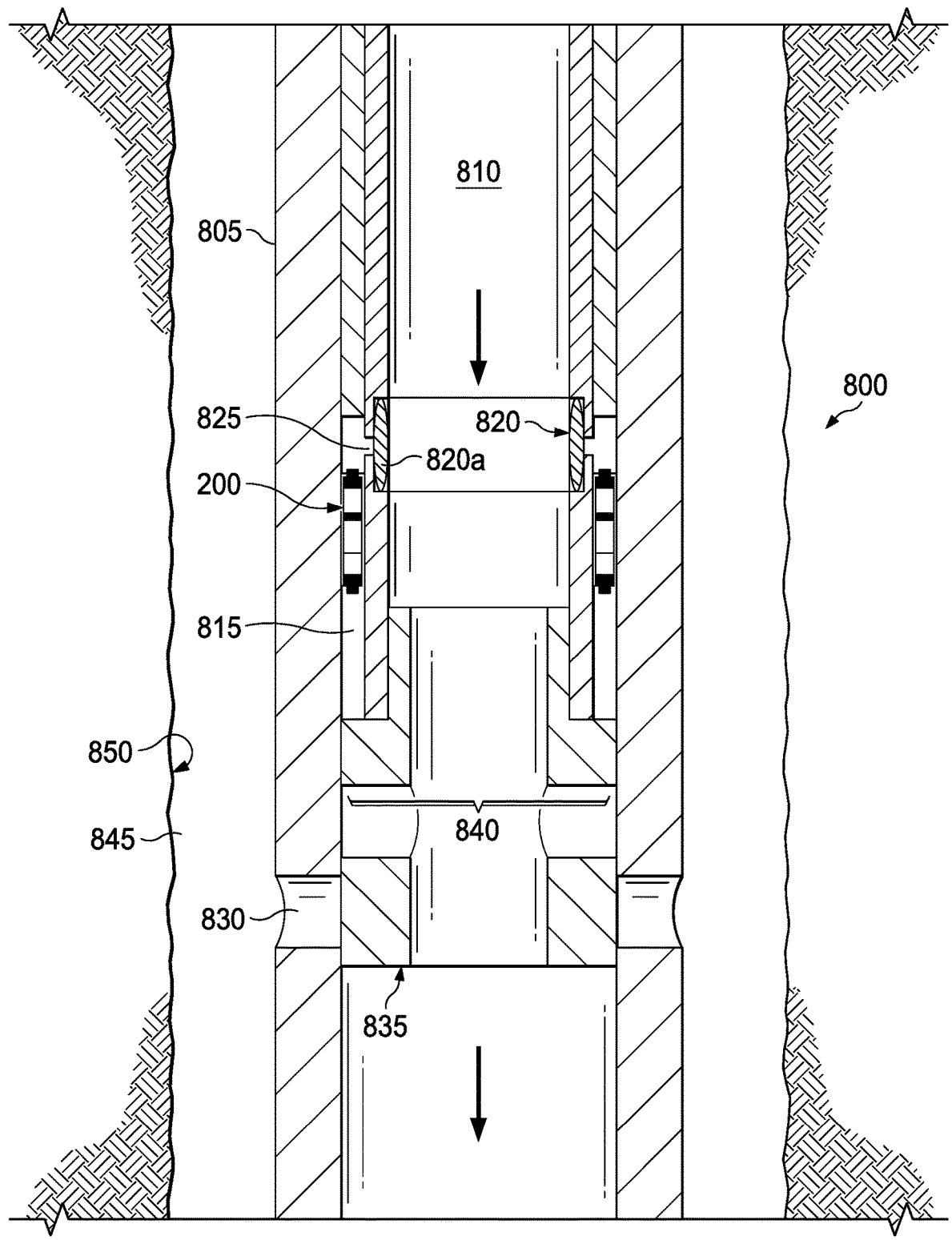
FIGS. 8A-8D illustrate sectional views of another embodiment of a completion tool in which a time delay valve may be implemented.

FIG. 8A illustrates another embodiment of a well completion tool 800. This embodiment comprises a tubular housing 805 that has an interior fluid pathway 810, and a valve chamber 815 in which an embodiment of the time delay valve 200, as discussed above, is located. In this embodiment, the time delay valve 200 is oriented in the valve chamber 815 such that the well fluid acts on the time delay valve 200 from an uphole direction. A valve gate 820, which in this embodiment is a burst or rupture disk 820a is within the tubular housing 805 to form a fluid seal between the interior fluid pathway 810 and an interior port 825 that fluidly connects the interior fluid pathway 200 with the valve chamber 815. The rupture disk 820a may be of any known design. When the appropriate amount of pressure is applied within the interior fluid pathway 810, the pressure bursts the rupture disk 820a to open flow through the interior port 825. As with other embodiments, the time delay valve 200 may be open prior to or after the placement of the completion tool 800 within a wellbore.

In this embodiment, the tubular housing 805 also has an exterior port 830 located downhole of the valve chamber 815 and the time delay valve 200. When opened, the exterior port 830 provides a fluid path from the interior fluid pathway 810 and into an annulus 845 of a wellbore 850. A sliding sleeve 835 is located downhole from the sliding sleeve 820a and is slidable with the tubular housing 805. The sliding sleeve 835 has a horizontal passageway 840 that extends through it. As explained below, the sliding sleeve 835 is moveable between a first closed position and a second, downhole open position. When in the open position, the horizontal passageway 840 aligns with the exterior port 830 to allow fluid to flow from the interior fluid pathway 810, through the exterior port 830 and into an annulus 845 of a wellbore 850.

Figure 8B:
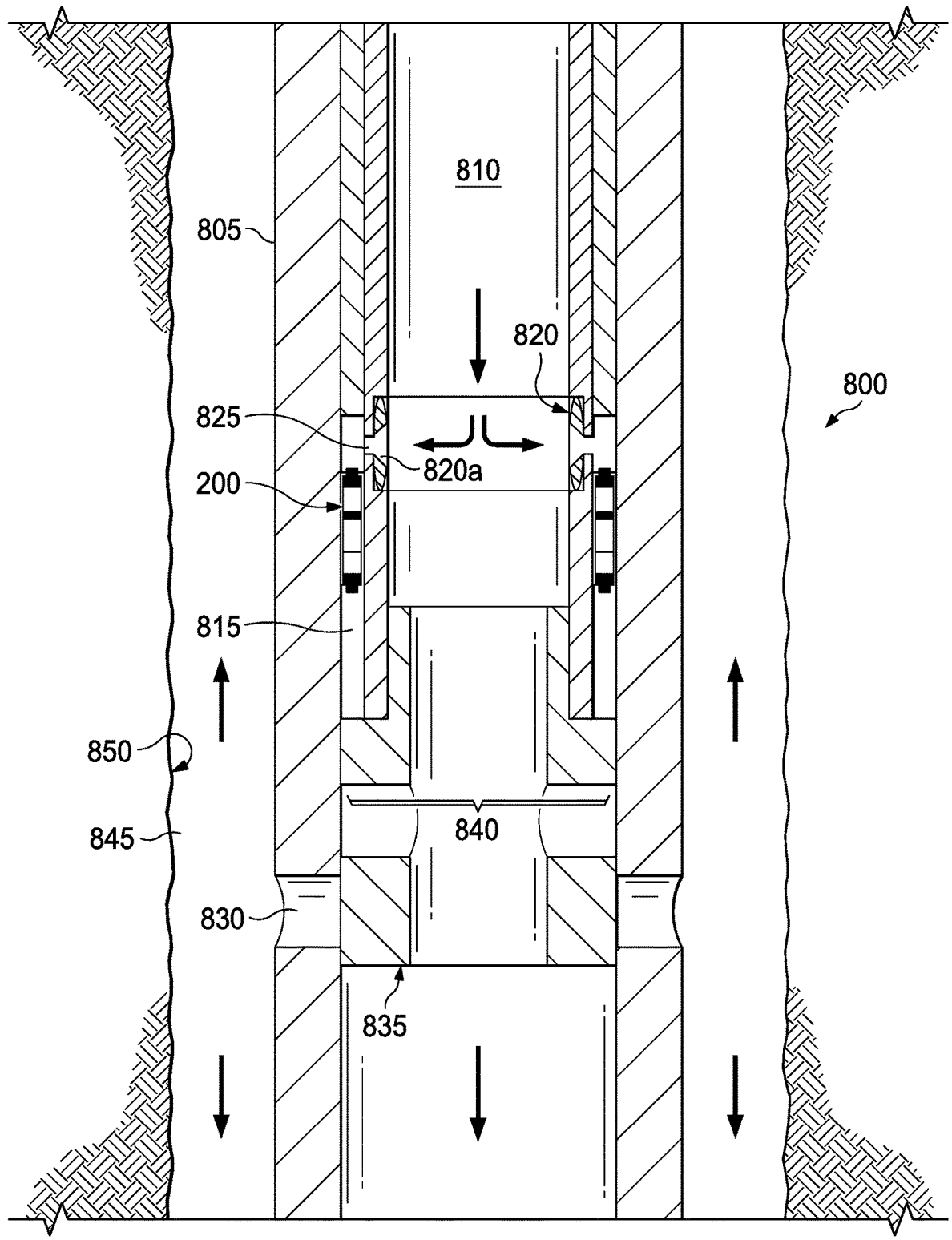

FIG. 8B illustrates the completion tool of FIG. 8A after rupture disk 820a has burst after application of a burst pressure. The bursting of the rupture disk 820a opens the interior port 825 that allows fluid from the interior fluid pathway 810 to flow through the interior port 825 and act on the time delay valve 200 in a manner as discussed above and flows into the downhole end of the valve camber 815, which creates a fluid pressure against a face of the sliding sleeve 835, as generally shown.

Figure 8C:
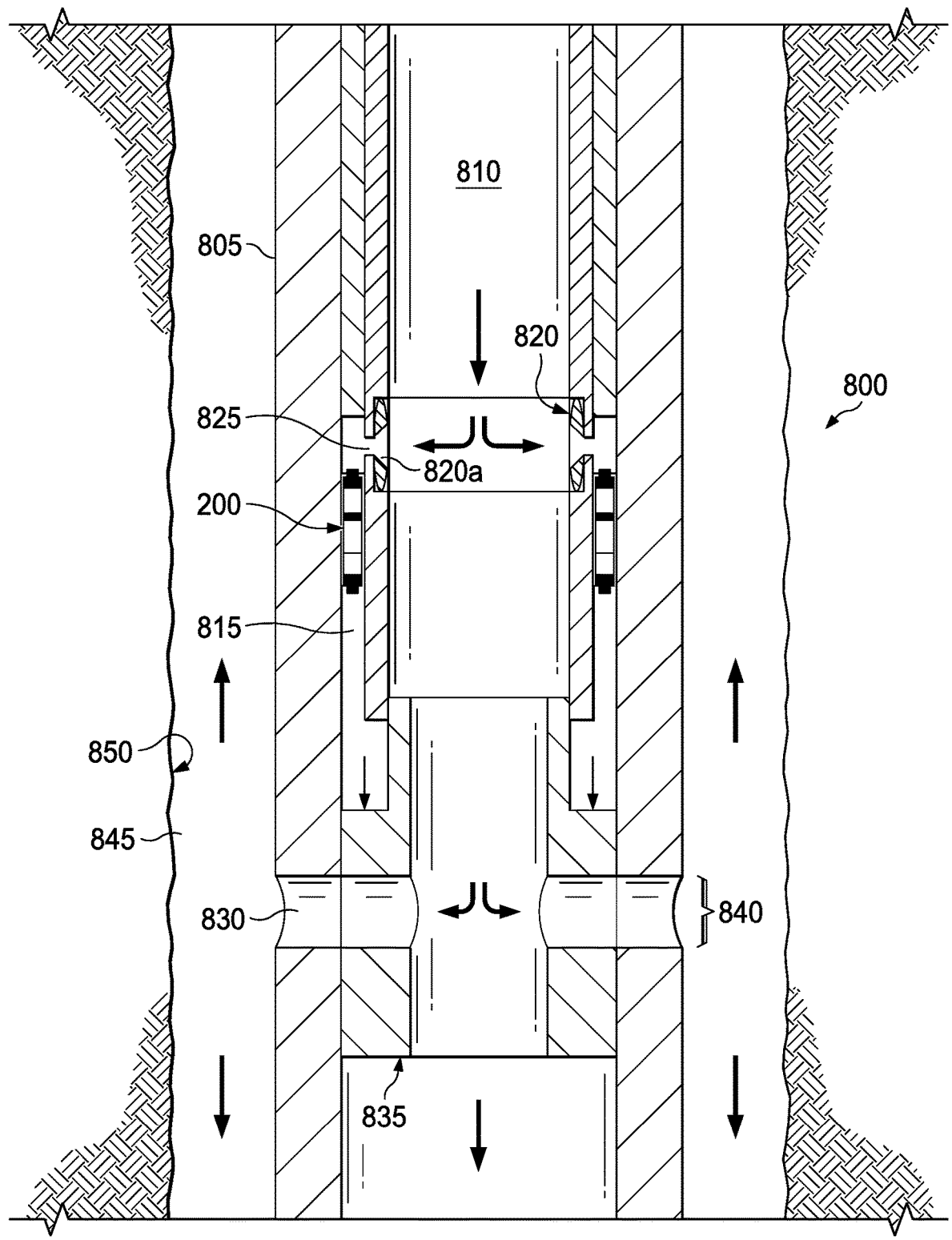
Figure 8D:
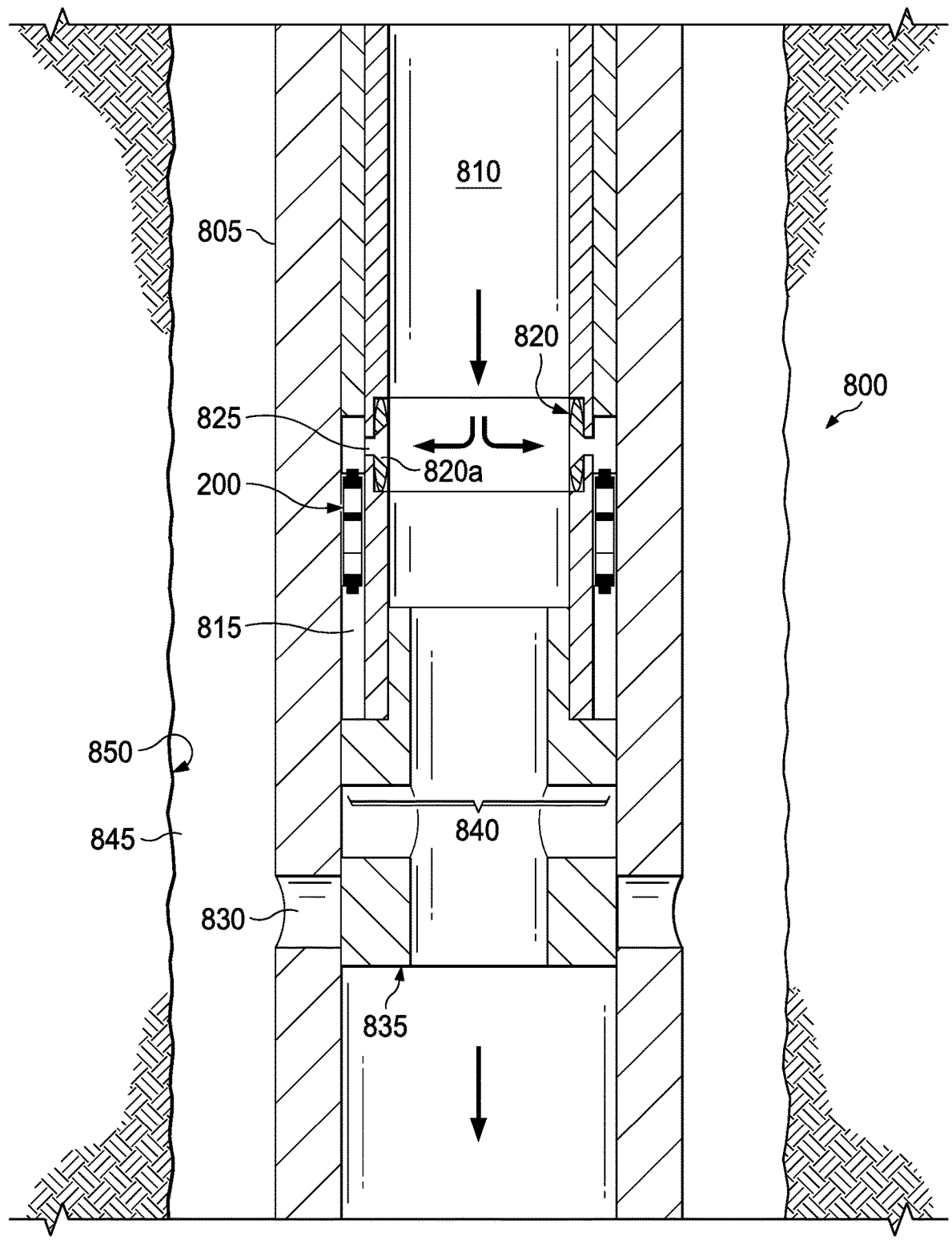

FIG. 8C illustrates the embodiment of FIG. 8B after the fluid pressure has moved the sliding sleeve 835 downhole to cause the horizontal passageway 840 to align with the exterior port 830. This port alignment provides a fluid path from the interior fluid pathway 810 into the annulus 840 of the wellbore 845, as shown. As with other embodiments, the zone of interest is isolated by packers that are not shown in this view. Thus, the fluid can flow into the targeted geological zone. For each completion operation, the time delay valve 200 remains open for the desired amount of time. Upon expiration of the predetermined amount of time, the time delay valve 200 operates in the manner discussed above to close time delay valve 200. After the time delay valve 200 closes, the fluid pressure within the valve chamber 815 bleeds off through a bleed off port associated with the time delay valve 200, thereby relieving the pressure within the valve chamber 815. Once the pressure is relieved within the valve chamber 815, the operating fluid pressure within the completion tool 800 moves the sliding sleeve 835 uphole to its initial position, thereby closing the exterior port 830, as shown in FIG. 8D. As with previous embodiments, once the time delay valve 200 is closed, the completion tool 800 may comprise sequential time delay valves 200 positioned along multiple geological zones of interest that can be sequentially completed without the time and expense associated with tripping different completion tools into and out of the wellbore.

Figure 9:
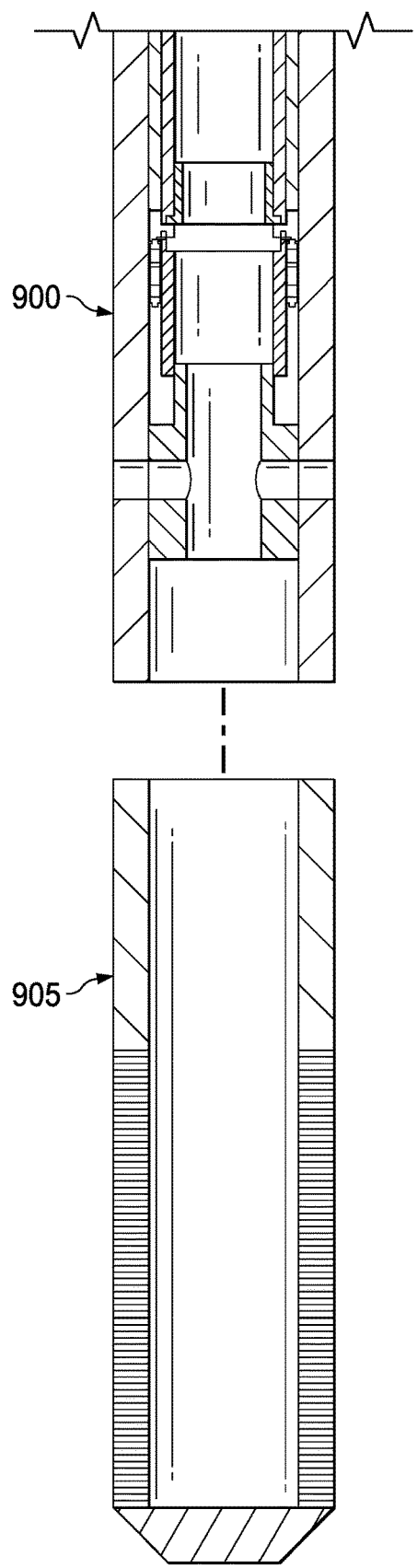
FIG. 9 illustrates a section view of an example of a completion assembly in which the completion tool of the embodiments described herein may be implemented.

FIG. 9 illustrates how various embodiments of the completion tool 900 can be coupled to a known gravel pack assembly 905 to complete gravel pack operations with a wellbore.

The invention having been generally described, the following embodiments are given by way of illustration and are not intended to limit the specification of the claims in any manner/

Embodiments herein comprise:

A well completion tool, comprising: a tubular housing having a valve chamber located within a side wall thereof and an interior port that opens into a valve chamber and forms a fluid path between an interior fluid pathway of the tubular housing and the valve chamber. A time delay valve is located within the valve chamber and is configured to control a fluid flow through. The valve chamber comprises a body defining a chamber for receiving or storing a reactant fluid therein. A reactive material is disposed in the body adjacent the chamber that reacts with the reactant fluid in response to contact with the reactant fluid from the valve chamber. A piston is disposed in the body. The piston is movable from an open state to a closed state in response to the reactive material interacting with the reactant fluid to close a flow path into the valve chamber after a predetermined time. A valve gate is located within the tubular housing and is actuatable to open the interior port between the valve chamber and the interior fluid pathway of the tubular housing to actuate the time delay valve.

Another embodiment is directed to

A well system comprising: a tubing string located within a wellbore each having a well fluid located therein, the tubing string supported by a working platform. The well completion tool is coupled to the tubing string and comprises; a tubular housing having a valve chamber located within a side wall thereof and an interior port that opens into a valve chamber and forms a fluid path between an interior fluid pathway of the tubular housing and the valve chamber. A time delay valve is located within the valve chamber and is configured to control a fluid flow through. The valve chamber comprises a body defining a chamber for receiving or storing a reactant fluid therein. A reactive material is disposed in the body adjacent the chamber that reacts with the reactant fluid in response to contact with the reactant fluid from the chamber. A piston is disposed in the body. The piston is movable from an open state to a closed state in response to the reactive material interacting with the reactant fluid to close a flow path through the valve chamber after a predetermined time. A valve gate is located within the tubular housing and is actuatable to open the interior port between the valve chamber and the interior fluid pathway of the tubular housing.

Another embodiment is directed to a method of operating a well completion tool, comprising: placing a force against a valve gate located within a tubular housing of a well completion tool in an annulus of a wellbore to open an interior port of the tubular housing; moving the valve gate in response to the force to open the interior port between a time delay valve located in a valve chamber of the tubular housing and an interior fluid pathway of the tubular housing; flowing a well fluid from an interior fluid pathway through the interior port and into the valve chamber and into the annulus of the wellbore by way of the time delay valve; contacting a reactive material with a reactant fluid within the time delay valve due to the flowing; and actuating the time delay valve due to the contacting to close a flow path of through the valve chamber to cease the well fluid to flow from the interior fluid pathway into the annulus of the wellbore, the time delay valve moving to a closed position after a predetermined time.

Element 1: wherein the valve gate is a sliding sleeve that is slidable within the tubular housing to open the interior port.

Element 2: wherein the sliding sleeve is configured to slide axially within the tubular housing.

Element 3: further comprising a valve chamber exterior port in a sidewall of the tubular housing that is fluidly connectable to the valve chamber through the interior port and wherein the sliding sleeve includes a ball seat for receiving a sealing ball thereon, and the sliding sleeve is movable to a downhole position that opens the interior port.

Element 4: wherein the tubular housing includes an exterior port located downhole of the valve chamber, and the sliding sleeve is a first sliding sleeve, and the well completion tool further includes a second sliding sleeve slidable within the tubular housing and located downhole from the first sliding sleeve, the first sliding sleeve moveable between a first closed position and a second open position wherein the interior port is open to the interior fluid pathway, the second sliding sleeve having a horizontal passageway therethough and being slidable within the fluid passageway in response to a fluid flow into the valve chamber to exert a force against the second sliding and move the second sliding sleeve downhole to cause the horizontal passageway of the second sliding sleeve to align with the exterior port of the tubular housing and form a well fluid path from the interior fluid pathway to an annulus of a wellbore.

Element 5: wherein a surface area of the first sliding sleeve is less than a surface area of the second sliding sleeve, such that the second sliding sleeve moves uphole to close the exterior port when the piston of the time delay valve moves to the closed state after the predetermined time has lapsed.

Element 6: wherein the valve gate is a rupture disk positioned between the interior fluid pathway of the tubular housing and the time delay valve, the rupture disk configured to burst at a determined pressure to allow a fluid flow from the interior fluid pathway and into the time valve chamber, and the well completion tool further comprising a sliding sleeve having a horizontal passageway therethough and located downhole of the valve chamber and being slidable along a length of the valve chamber in response to a fluid flow into the valve chamber to exert a force against the sliding sleeve and move the sliding sleeve downhole to cause the horizontal passageway of the sliding sleeve to align with an exterior port of the tubular housing and form a fluid path from the interior fluid pathway and the exterior port to an annulus of a wellbore.

Element 7: further comprising a gravel pack screen coupled to the tubular housing.

Element 8: wherein the valve gate is a sliding sleeve that is slidable within the tubular housing to open the interior port.

Element 9: wherein the sliding sleeve is configured to slide axially within the tubular housing.

Element 10: further comprising a valve chamber exterior port in a sidewall of the tubular housing that is connected to the valve chamber and wherein the sliding sleeve includes a ball seat for receiving a sealing ball thereon, and the sliding sleeve is movable downhole to a position that opens the interior port to allow the well fluid to enter the valve chamber and actuate the time delay valve and allow a well fluid flow through the valve chamber and out the exterior port and into an annulus of the wellbore.

Element 11: wherein the tubular housing includes an exterior port located downhole of the valve chamber, and the sliding sleeve is a first sliding sleeve, and the well completion tool further includes a second sliding sleeve slidable within the tubular housing and located downhole from the first sliding sleeve, the first sliding sleeve moveable between a first closed position and a second open position wherein the interior port is open to the interior fluid pathway, the second sliding sleeve having a horizontal passageway therethough and being slidable within the fluid passageway in response to a fluid flow into the valve chamber to exert a force against the second sliding and move the second sliding sleeve downhole to cause the horizontal passageway of the second sliding sleeve to align with the exterior port of the tubular housing and form a well fluid path from the interior fluid pathway to an annulus of the wellbore.

Element 12: wherein a surface area of the first sliding sleeve is less than a surface area of the second sliding sleeve, such that the second sliding sleeve moves uphole to close the exterior port when the piston of the time delay valve moves to the closed state after the predetermined time has lapsed.

Element 13: wherein the valve gate is a rupture disk positioned between the interior fluid pathway of the tubular housing and the time delay valve, the rupture disk configured to burst at a determined pressure to allow a fluid flow from the interior fluid pathway and into the time valve chamber, and the well completion tool further comprising a sliding sleeve having a horizontal passageway therethough and located downhole of the valve chamber and being slidable along a length of the valve chamber in response to a fluid flow into the valve chamber to exert a force against the sliding sleeve and move the sliding sleeve downhole to cause the horizontal passageway of the sliding sleeve to align with an exterior port of the tubular housing and form a fluid path from the interior fluid pathway and the exterior port to an annulus of a wellbore.

Element 14: wherein the valve gate is a sliding sleeve and moving the valve gate includes sliding the sliding sleeve within the tubular housing to open the interior port.

Element 15: further comprising a valve chamber exterior port in a sidewall of the tubular housing that is fluidly connectable to the valve chamber, and wherein moving the sliding sleeve includes placing a ball on a ball seat and placing pressure against the sliding sleeve to move the sliding sleeve to a downhole position to open the interior port.

Element 16: wherein the tubular housing includes an exterior port located downhole of the valve chamber, and the sliding sleeve is a first sliding sleeve, and the well completion tool further includes a second sliding sleeve slidable with the tubular housing and located downhole from the time delay valve, and moving the gate valve includes moving the first sliding sleeve uphole to open the interior port and allow the well fluid to flow into the valve chamber and move the second sliding sleeve downhole to cause a horizontal passageway of the second sliding sleeve to align with the exterior port of the tubular housing and form a well fluid path from the interior fluid pathway into the annulus of the wellbore.

Element 17: wherein moving the valve gate includes rupturing a rupture disk positioned between the interior fluid pathway of the tubular housing and the time delay valve to allow a fluid flow from the interior fluid pathway and into the valve chamber to move a sliding sleeve downhole from the time delay valve to cause a horizontal passageway of the sliding sleeve to align with an exterior port of the tubular housing and form a well fluid path from the interior fluid pathway into the annulus of the wellbore.

Those skilled in the art to which this application relates will appreciate that other and further additions, deletions, substitutions and modifications may be made to the described embodiments.

What is claimed is:

1. A well completion tool, comprising:
   a tubular housing having a valve chamber located within a side wall thereof and an interior port that opens into a valve chamber and forms a fluid path between an interior fluid pathway of the tubular housing and the valve chamber;
   a time delay valve located within the valve chamber and configured to control a fluid flow through the valve chamber and, comprising:
      a body defining a chamber for receiving or storing a reactant fluid therein;
      a reactive material disposed in the body adjacent the chamber that reacts with the reactant fluid in response to contact with the reactant fluid from the valve chamber; and
      a piston disposed in the body, the piston movable from an open state to a closed state in response to the reactive material interacting with the reactant fluid to expand the reactive material in volume to slide the piston to close a flow path into the valve chamber after a predetermined time; and
   a valve gate located within the tubular housing and actuatable to open the interior port between the valve chamber and the interior fluid pathway of the tubular housing to actuate the time delay valve.

2. The well completion tool of claim 1, wherein the valve gate is a sliding sleeve that is slidable within the tubular housing to open the interior port.

3. The well completion tool of claim 2, wherein the sliding sleeve is configured to slide axially within the tubular housing.

4. The well completion tool of claim 3, further comprising a valve chamber exterior port in a sidewall of the tubular housing that is fluidly connectable to the valve chamber through the interior port and wherein the sliding sleeve includes a ball seat for receiving a sealing ball thereon, and the sliding sleeve is movable to a downhole position that opens the interior port.

5. The well completion tool of claim 2, wherein the tubular housing includes an exterior port located downhole of the valve chamber, and the sliding sleeve is a first sliding sleeve, and the well completion tool further includes a second sliding sleeve slidable within the tubular housing and located downhole from the first sliding sleeve, the first sliding sleeve moveable between a first closed position and a second open position wherein the interior port is open to the interior fluid pathway, the second sliding sleeve having a horizontal passageway therethough and being slidable within the fluid passageway in response to a fluid flow into the valve chamber to exert a force against the second sliding and move the second sliding sleeve downhole to cause the horizontal passageway of the second sliding sleeve to align with the exterior port of the tubular housing and form a well fluid path from the interior fluid pathway to an annulus of a wellbore.

6. The well completion tool of claim 5, wherein a surface area of the first sliding sleeve is less than a surface area of the second sliding sleeve, such that the second sliding sleeve moves uphole to close the exterior port when the piston of the time delay valve moves to the closed state after the predetermined time has lapsed.

7. The well completion tool of claim 1, wherein the valve gate is a rupture disk positioned between the interior fluid pathway of the tubular housing and the time delay valve, the rupture disk configured to burst at a determined pressure to allow a fluid flow from the interior fluid pathway and into the time valve chamber, and the well completion tool further comprising a sliding sleeve having a horizontal passageway therethough and located downhole of the valve chamber and being slidable along a length of the valve chamber in response to a fluid flow into the valve chamber to exert a force against the sliding sleeve and move the sliding sleeve downhole to cause the horizontal passageway of the sliding sleeve to align with an exterior port of the tubular housing and form a fluid path from the interior fluid pathway and the exterior port to an annulus of a wellbore.

8. The well completion tool of claim 1, further comprising a gravel pack screen coupled to the tubular housing.

9. A well system comprising:
a tubing string located within a wellbore each having a well fluid located therein, the tubing string supported by a working platform; and
a well completion tool coupled to the tubing string and comprising;
a tubular housing having a valve chamber located within a side wall thereof and an interior port that opens into a valve chamber and forms a fluid path between an interior fluid pathway of the tubular housing and the valve chamber;
a time delay valve located within the valve chamber and configured to control a fluid flow through the valve chamber and, comprising:
a body defining a chamber for receiving or storing a reactant fluid therein;
a reactive material disposed in the body adjacent the chamber that reacts with the reactant fluid in response to contact with the reactant fluid from the chamber; and
a piston disposed in the body, the piston movable from an open state to a closed state in response to the reactive material interacting with the reactant fluid to expand the reactive material in volume to slide the piston to close a flow path through the valve chamber after a predetermined time; and
a valve gate located within the tubular housing and actuatable to open the interior port between the valve chamber and the interior fluid pathway of the tubular housing.

10. The well system of claim 9, wherein the valve gate is a sliding sleeve that is slidable within the tubular housing to open the interior port.

11. The well system of claim 10, wherein the sliding sleeve is configured to slide axially within the tubular housing.

12. The well system of claim 11, further comprising a valve chamber exterior port in a sidewall of the tubular housing that is connected to the valve chamber and wherein the sliding sleeve includes a ball seat for receiving a sealing ball thereon, and the sliding sleeve is movable downhole to a position that opens the interior port to allow the well fluid to enter the valve chamber and actuate the time delay valve and allow a well fluid flow through the valve chamber and out the exterior port and into an annulus of the wellbore.

13. The well system of claim 10, wherein the tubular housing includes an exterior port located downhole of the valve chamber, and the sliding sleeve is a first sliding sleeve, and the well completion tool further includes a second sliding sleeve slidable within the tubular housing and located downhole from the first sliding sleeve, the first sliding sleeve moveable between a first closed position and a second open position wherein the interior port is open to the interior fluid pathway, the second sliding sleeve having a horizontal passageway therethough and being slidable within the fluid passageway in response to a fluid flow into the valve chamber to exert a force against the second sliding and move the second sliding sleeve downhole to cause the horizontal passageway of the second sliding sleeve to align with the exterior port of the tubular housing and form a well fluid path from the interior fluid pathway to an annulus of the wellbore.

14. The well system of claim 13, wherein a surface area of the first sliding sleeve is less than a surface area of the second sliding sleeve, such that the second sliding sleeve moves uphole to close the exterior port when the piston of the time delay valve moves to the closed state after the predetermined time has lapsed.

15. The well system of claim 9, wherein the valve gate is a rupture disk positioned between the interior fluid pathway of the tubular housing and the time delay valve, the rupture disk configured to burst at a determined pressure to allow a fluid flow from the interior fluid pathway and into the time valve chamber, and the well completion tool further comprising a sliding sleeve having a horizontal passageway therethough and located downhole of the valve chamber and being slidable along a length of the valve chamber in response to a fluid flow into the valve chamber to exert a force against the sliding sleeve and move the sliding sleeve downhole to cause the horizontal passageway of the sliding sleeve to align with an exterior port of the tubular housing and form a fluid path from the interior fluid pathway and the exterior port to an annulus of a wellbore.

16. A method of operating a well completion tool, comprising:
- placing a force against a valve gate located within a tubular housing of a well completion tool in an annulus of a wellbore to open an interior port of the tubular housing;
- moving the valve gate in response to the force to open the interior port between a time delay valve located in a valve chamber of the tubular housing and an interior fluid pathway of the tubular housing;
- flowing a well fluid from an interior fluid pathway through the interior port and into the valve chamber and into the annulus of the wellbore by way of the time delay valve;
- contacting a reactive material with a reactant fluid within the time delay valve due to the flowing, the contacting causing the reactive material to expand in volume;
- actuating the time delay valve due to the contacting and expanding in volume of the reactive material to close a flow path of through the valve chamber to cease the well fluid to flow from the interior fluid pathway into the annulus of the wellbore, the time delay valve moving to a closed position after a predetermined time.

17. The method of claim 16, wherein the valve gate is a sliding sleeve and moving the valve gate includes sliding the sliding sleeve within the tubular housing to open the interior port.

18. The method of claim 17, further comprising a valve chamber exterior port in a sidewall of the tubular housing that is fluidly connectable to the valve chamber, and wherein moving the sliding sleeve includes placing a ball on a ball seat and placing pressure against the sliding sleeve to move the sliding sleeve to a downhole position to open the interior port.

19. The method of claim 18, wherein the tubular housing includes an exterior port located downhole of the valve chamber, and the sliding sleeve is a first sliding sleeve, and the well completion tool further includes a second sliding sleeve slidable with the tubular housing and located downhole from the time delay valve, and moving the gate valve includes moving the first sliding sleeve uphole to open the interior port and allow the well fluid to flow into the valve chamber and move the second sliding sleeve downhole to cause a horizontal passageway of the second sliding sleeve to align with the exterior port of the tubular housing and form a well fluid path from the interior fluid pathway into the annulus of the wellbore.

20. The method of claim 16, wherein moving the valve gate includes rupturing a rupture disk positioned between the interior fluid pathway of the tubular housing and the time delay valve to allow a fluid flow from the interior fluid pathway and into the valve chamber to move a sliding sleeve downhole from the time delay valve to cause a horizontal passageway of the sliding sleeve to align with an exterior port of the tubular housing and form a well fluid path from the interior fluid pathway into the annulus of the wellbore.

\* \* \* \* \*